United States Patent
Wang et al.

(10) Patent No.: US 12,545,807 B2
(45) Date of Patent: Feb. 10, 2026

(54) LOW TEMPERATURE CURE COATING COMPOSITIONS

(71) Applicant: PPG Industries Ohio, Inc., Cleveland, OH (US)

(72) Inventors: Wei Wang, Allison Park, PA (US); Dennis Leroy Faler, North Huntingdon, PA (US); Sara Ashley Friello, Pittsburgh, PA (US); Paul H. Lamers, Allison Park, PA (US); Steven Edward Bowles, Pittsburgh, PA (US); David Robert Fenn, Allison Park, PA (US); Chester Szymanski, Allison Park, PA (US); Shanti Swarup, Allison Park, PA (US); Hongying Zhou, Allison Park, PA (US); Hilary Ann Kerchner, Gibsonia, PA (US); Gobinda Saha, Pittsburgh, PA (US); Brian Endlich, Apollo, PA (US)

(73) Assignee: PPG Industries Ohio, Inc., Cleveland, OH (US)

(*) Notice: Subject to any disclaimer, the term of this patent is extended or adjusted under 35 U.S.C. 154(b) by 635 days.

(21) Appl. No.: 17/757,034

(22) PCT Filed: Dec. 10, 2020

(86) PCT No.: PCT/US2020/064155
§ 371 (c)(1),
(2) Date: Jun. 8, 2022

(87) PCT Pub. No.: WO2021/119222
PCT Pub. Date: Jun. 17, 2021

(65) Prior Publication Data
US 2023/0033514 A1    Feb. 2, 2023

Related U.S. Application Data

(60) Provisional application No. 62/946,160, filed on Dec. 10, 2019.

(51) Int. Cl.
| | | |
|---|---|---|
| *C09D 175/06* | (2006.01) | |
| *C09D 5/02* | (2006.01) | |
| *C09D 7/63* | (2018.01) | |
| *C09D 7/65* | (2018.01) | |

(52) U.S. Cl.
CPC .......... *C09D 175/06* (2013.01); *C09D 5/022* (2013.01); *C09D 7/63* (2018.01); *C09D 7/65* (2018.01)

(58) Field of Classification Search
CPC ...... C09D 175/06; C09D 175/04; C09D 7/65; C09D 7/63; C09D 5/22
See application file for complete search history.

(56) References Cited

U.S. PATENT DOCUMENTS

| | | |
|---|---|---|
| 4,335,029 A | 6/1982 | Dabi et al. |
| 4,521,460 A | 6/1985 | Dabi et al. |
| 4,650,718 A | 3/1987 | Simpson et al. |
| 4,933,056 A | 6/1990 | Corrigan et al. |
| 5,530,043 A | 6/1996 | Zawacky et al. |
| 5,760,107 A | 6/1998 | Valko et al. |
| 5,814,410 A | 9/1998 | Singer et al. |
| 5,820,987 A | 10/1998 | Kaufman et al. |
| 5,891,981 A | 4/1999 | Mauer et al. |
| 6,316,119 B1 | 11/2001 | Metzger et al. |
| 7,576,157 B2 | 8/2009 | Pajerski |
| 7,619,019 B2 | 11/2009 | Drescher et al. |
| 8,846,156 B2 | 9/2014 | Swarup et al. |
| 9,334,432 B2 | 5/2016 | Zhou et al. |
| 9,522,413 B2 | 12/2016 | Swarup et al. |
| 2002/0103292 A1 | 8/2002 | Blum et al. |
| 2002/0115763 A1 | 8/2002 | Robinson et al. |
| 2003/0220446 A1 | 11/2003 | Faler et al. |
| 2005/0003093 A1 | 1/2005 | Hesselmans et al. |

(Continued)

FOREIGN PATENT DOCUMENTS

| | | | |
|---|---|---|---|
| CN | 1332776 A | 1/2002 | |
| CN | 102232091 A | 11/2011 | |
| CN | 104066760 A | 9/2014 | |
| CN | 106574136 A | 4/2017 | |
| CN | 108350131 A | 7/2018 | |
| CN | 108778529 A | 11/2018 | |
| CN | 108779351 A | 11/2018 | |
| CN | 109642099 A | 4/2019 | |
| DE | 1807072 A1 * | 5/1970 | .......... D06M 13/422 |
| EP | 0765922 A1 | 4/1997 | |
| EP | 1454971 A1 | 9/2004 | |
| EP | 2933374 A1 | 10/2015 | |
| EP | 3708598 A1 | 9/2020 | |

(Continued)

OTHER PUBLICATIONS

WO 2020003877A1 machine translation (Year: 2019).*

(Continued)

*Primary Examiner* — Mark Eashoo
*Assistant Examiner* — Caitlin Norine Illing

(57) ABSTRACT

A film-forming thermoset coating composition includes: (a) an aqueous medium; and Option 1 and/or Option 2 as follows: Option 1: (b1) polyurethane-acrylate core-shell particles including a polymeric acrylic core at least partially encapsulated by a polymeric shell including urethane linkages, where the polymeric shell includes an acid functional group and two or more hydrazide functional groups, where the polymeric shell is covalently bonded to at least a portion of the polymeric core; and (c1) (i) formaldehyde; (ii) polyformaldehyde; and/or (iii) a compound that generates formaldehyde; Option 2: (b2) polyurethane-acrylate core-shell particles including a polymeric acrylic core at least partially encapsulated by a polymeric shell including urethane linkages, where the polymeric shell includes an acid functional group and two or more N-methylolated hydrazide functional groups, where the polymeric shell is covalently bonded to at least a portion of the polymeric core.

20 Claims, No Drawings

(56) References Cited

U.S. PATENT DOCUMENTS

| | | |
|---|---|---|
| 2006/0047051 A1 | 3/2006 | Ma et al. |
| 2006/0223953 A1 | 10/2006 | Drescher et al. |
| 2011/0009561 A1 | 1/2011 | Pajerski et al. |
| 2011/0070374 A1 | 3/2011 | Ambrose et al. |
| 2011/0245399 A1 | 10/2011 | Pajerski et al. |
| 2014/0242280 A1 | 8/2014 | Swarup et al. |
| 2014/0272419 A1 | 9/2014 | Furar et al. |
| 2014/0377468 A1 | 12/2014 | Swarup et al. |
| 2015/0005444 A1 | 1/2015 | Grablowitz et al. |
| 2015/0210883 A1 | 7/2015 | Swarup et al. |
| 2015/0267077 A1 | 9/2015 | Janoski et al. |
| 2015/0307738 A1 | 10/2015 | Schmucker et al. |
| 2016/0002456 A1 | 1/2016 | Sheerin et al. |
| 2017/0136493 A1 | 5/2017 | Lamers et al. |
| 2018/0230327 A1 | 8/2018 | Kanda |
| 2019/0002709 A1 | 1/2019 | Xu et al. |
| 2019/0085200 A1 | 3/2019 | Jordan et al. |
| 2019/0085203 A1 | 3/2019 | Faler et al. |
| 2019/0161640 A1 | 5/2019 | Gottumukkala et al. |
| 2020/0017712 A1 | 1/2020 | Steinmetz et al. |
| 2020/0239730 A1 | 7/2020 | Martin et al. |
| 2020/0290086 A1 | 9/2020 | Xu et al. |
| 2021/0040350 A1 | 2/2021 | Swarup et al. |
| 2022/0332973 A1 | 10/2022 | Swarup et al. |

FOREIGN PATENT DOCUMENTS

| | | | |
|---|---|---|---|
| GB | 2089359 A | 6/1982 | |
| JP | 2013-221041 A | 10/2013 | |
| KR | 10-2016-0149246 A | 12/2016 | |
| KR | 10-2018-0113592 A | 10/2018 | |
| WO | WO-2017160398 A1 * | 9/2017 | ........... B05D 3/0254 |
| WO | 2017180220 A1 | 10/2017 | |
| WO | 2018022780 A1 | 2/2018 | |
| WO | WO-2020003877 A1 * | 1/2020 | ............... H05K 1/09 |
| WO | 2020141481 A1 | 7/2020 | |
| WO | 2021119222 A1 | 6/2021 | |

OTHER PUBLICATIONS

Bullermann et al, Synthesis and Characterization of Polyurethane Ionomers with Trimellitic Anhydride and Dimethylol Propionic Acid for Waterborne Self-Emulsifying Dispersions, Journal of Polymer Science: Polymer Chemistry, vol. 52, Issue 5, p. 680-690 (Year: 2014).*
National Center for Biotechnology Information (2024). PubChem Compound Summary for CID 444972, Fumaric Acid. Retrieved Nov. 25, 2024 from https://pubchem.ncbi.nlm.nih.gov/compound/Fumaric-Acid. (Year: 2024).*
Occupational Safety and Health Administration, OSHA Fact Sheet: Formaldehyde, 2011, p. 1-2 (Year: 2011).*
"Water Soluble Polymer," Edited by Yan Ruixuan, 1998.
Fuan. Y. et al., "Synthesis of core-shell structure acrylate emulsion and preparation of wood sealing primer," China Paint, vol. 26, Issue 5, 2011.
Office Action received for Australian Patent Application No. 2020324424, mailed on Feb. 13, 2023 4 pages.
Office Action received for Canadian Patent Application No. 3147080, mailed on Feb. 22, 2023, 4 pages.
Office Action received for Chinese Patent Application No. 202080085711.7, mailed on Feb. 25, 2023, 34 pages (21 pages of English Translation and 13 pages of Original Document).
Office Action received for Japanese Patent Application No. 2022-507409, mailed on Feb. 14, 2023, 3 pages.
Ming. Z. et al., "manufacture of acrylic resin equipment and their use in coatings Application and research status," Shanghai Paint, Issue 07, 2007, pp. 88.
Office Action received for Chinese Patent Application No. 202080085711.7, mailed on Aug. 4, 2023, 18 pages (10 pages of English Translation and 8 pages of Original Document).
Office Action received for Chinese Patent Application No. 202080066759.3, mailed on Jul. 1, 2023, 19 pages (10 pages of English Translation and 9 pages of Original Document).
Office Action received for Korean Patent Application No. 10-2022-7007248 , mailed on Apr. 18, 2024, 12 pages (6 pages of English Translation and 6 pages of Original Document).
International Preliminary Report on Patentability received for PCT Patent Application No. PCT/US2020/044936, mailed on Jul. 12, 2021, 3 pages.
International Preliminary Report on Patentability received for PCT Patent Application No. PCT/US2022/064155, mailed on Jun. 23, 2022, 8 pages.
International Search Report and Written Opinion received for PCT Patent Application No. PCT/US2020/044936, mailed on Nov. 16, 2020, 11 pages.
Non-Final Office Action received for U.S. Appl. No. 16/531,400, mailed on Mar. 25, 2022, 8 pages.
Office Action received for Chinese Patent Application No. 202080066759.3, mailed on Oct. 10, 2022, 26 pages (16 pages of English Translation and 10 pages of Original Document).
Restriction Requirement received for U.S. Appl. No. 16/531,400, mailed on Dec. 24, 2021, 8 pages.
Office Action received for Australian Patent Application No. 2020324424, mailed on Jun. 2, 2023, 4 pages.
Decision to grant received for European Patent Application No. 20760672.4, mailed on Sep. 14, 2023, 2 pages.
Intention to grant received for European Patent Application No. 20760672.4, mailed on May 17, 2023, 7 pages.
International Search Report and Written Opinion received for PCT Application Serial No. PCT/US2020/064155 dated Mar. 9, 2021, 10 pages.

* cited by examiner

LOW TEMPERATURE CURE COATING COMPOSITIONS

FIELD OF THE INVENTION

The present invention relates to a film-forming thermoset coating composition.

BACKGROUND OF THE INVENTION

Coatings are applied to a wide variety of substrates to provide color and other visual effects, corrosion resistance, abrasion resistance, chemical resistance, and the like.

Many automotive original equipment manufacturer (OEM) coatings, such as automotive basecoats, are curable at temperatures greater than 120° C., and it is difficult to achieve good curing at lower temperatures of 100° C. or less. Moreover, certain materials used in automotive components and coated with coating compositions cannot withstand curing at the higher temperatures without deforming, distorting, or otherwise degrading.

SUMMARY OF THE INVENTION

The present invention is directed to a film-forming thermoset coating composition including: (a) an aqueous medium; and Option 1 and/or Option 2 as follows: Option 1: (b1) polyurethane-acrylate core-shell particles including a polymeric acrylic core at least partially encapsulated by a polymeric shell including urethane linkages, where the polymeric shell includes an acid functional group and two or more hydrazide functional groups, where the polymeric shell is covalently bonded to at least a portion of the polymeric core; and (c1) (i) formaldehyde; (ii) polyformaldehyde; and/or (iii) a compound that generates formaldehyde; Option 2: (b2) polyurethane-acrylate core-shell particles including a polymeric acrylic core at least partially encapsulated by a polymeric shell including urethane linkages, where the polymeric shell includes an acid functional group and two or more N-methylolated hydrazide functional groups, where the polymeric shell is covalently bonded to at least a portion of the polymeric core.

The present invention is also directed to a film-forming thermoset coating composition, including: (a) an aqueous medium; (b1) polyurethane-acrylate core-shell particles including a polymeric acrylic core at least partially encapsulated by a polymeric shell including urethane linkages, where the polymeric shell includes an acid functional group and two or more hydrazide functional groups, where the polymeric shell is covalently bonded to at least a portion of the polymeric core; and (c1) (i) formaldehyde; (ii) polyformaldehyde; and/or (iii) a compound that generates formaldehyde.

The present invention is also directed to a film-forming thermoset coating composition, including: (a) an aqueous medium; and (b2) polyurethane-acrylate core-shell particles including a polymeric acrylic core at least partially encapsulated by a polymeric shell including urethane linkages, where the polymeric shell includes an acid functional group and two or more N-methylolated hydrazide functional groups, where the polymeric shell is covalently bonded to at least a portion of the polymeric core.

The present invention is also directed to a process for the preparation of a film-forming thermoset coating composition, including: (A) mixing (c1) (i) formaldehyde; (ii) polyformaldehyde; and/or (iii) a compound that generates formaldehyde with a composition including (b1) polyurethane-acrylate core-shell particles, including a polymeric acrylic core at least partially encapsulated by a polymeric shell including urethane linkages, where the polymeric shell includes an acid functional group and two or more hydrazide functional groups, where the polymeric shell is covalently bonded to at least a portion of the polymeric core, (B) aging the mixture provided in step (A) for a time period to form the N-methylolated hydrazide functional groups in the polyurethane-acrylate core-shell particles, and (C) including the mixture obtained in step (B) into a composition in order to prepare a film-forming thermoset coating composition comprising an aqueous medium.

The present invention is also directed to a process for the preparation of a film-forming thermoset coating composition, including: (A) mixing (c1) (i) formaldehyde; (ii) polyformaldehyde; and/or (iii) a compound that generates formaldehyde with a composition including (b1) polyurethane-acrylate core-shell particles, including a polymeric acrylic core at least partially encapsulated by a polymeric shell including urethane linkages, where the polymeric shell includes an acid functional group and two or more hydrazide functional groups, where the polymeric shell is covalently bonded to at least a portion of the polymeric core, in order to prepare a film-forming thermoset coating composition including an aqueous medium, and (B) aging the mixture provided in step (A) for a time period to form the N-methylolated hydrazide functional groups in the polyurethane-acrylate core-shell particles.

DESCRIPTION OF THE INVENTION

For the purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses the singular, unless specifically stated otherwise. In addition, in this application, the use of "or" means "and/or" unless specifically stated otherwise, even though "and/or" may be explicitly used in certain instances. Further, in this application, the use of "a" or "an" means "at least one" unless specifically stated otherwise. For example, "a" polymer, "an" acid, and the like refer to one or more of any of these items.

As used herein, a "film-forming resin" refers to a self-supporting continuous film on at least a horizontal surface of a substrate upon removal of any diluents or carriers present in the composition or upon curing. Also, as used herein, the term "polymer" is meant to refer to prepolymers, oligomers, and both homopolymers and copolymers. The term "resin" is used interchangeably with "polymer".

As used herein, the transitional term "comprising" (and other comparable terms, e.g., "containing" and "including") is "open-ended" and open to the inclusion of unspecified matter. Although described in terms of "comprising", the terms "consisting essentially of" and "consisting of" are also within the scope of the invention.

As used herein, the term "hydrazide functional group" refers to a group having the following structure (Ia) or (Ib), and a hydrazide functional material (e.g., hydrazide functional polymer, hydrazide functional oligomer, hydrazide functional compound) refers to a material comprising at least one hydrazide functional group:

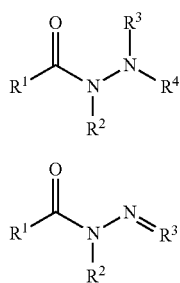

(Ia)

(Ib)

where $R^1$ (in structure (Ia)-(VI)) is an alkyl, cycloalkyl, or aryl group bonded directly to the carbonyl carbon, wherein the alkyl, cycloalkyl, or aryl group bonded to the carbonyl carbon may be a linking group bonded to another suitable atom, molecule, or polymer chain; and $R^2$-$R^4$ (in structure (Ia)-(VI)) are any suitable atom, molecule, or polymer chain, and wherein the $R^2$-$R^4$ groups may be the same or different from one another. The suitable atom may include a hydrogen atom (where chemically suitable) or any other suitable atom. In structure (Ia) at least one of $R^2$-$R^4$ may be a hydrogen atom. In structure (Ib), $R^2$ may be a hydrogen atom.

The hydrazide functional material may be formed from a reaction including adipic dihydrazide (ADH).

For example, a hydrazide functional material may comprise a group having the following structure (II) (also consistent with structure (Ia)):

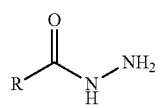

(II)

where R is $R^1$.

For example, a hydrazide functional material may comprise a group resulting from the reaction of hydrazide and isocyanate having the following structure (III) (also consistent with structure (Ia)):

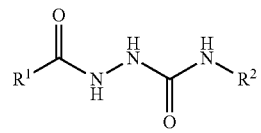

(III)

For example, a hydrazide functional material may comprise a group resulting from the reaction of hydrazide with a ketone or aldehyde group having the following structure (IV) (also consistent with structure (Ib)):

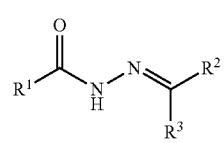

(IV)

For example, a hydrazide functional material may comprise a hydrazide (e.g., adipic acid dihydrazide) added to an acrylate. Such material may be used to create a hydrazide functional shell of the core-shell particle described hereinafter. The hydrazide added to an acrylate may have the following structure (V) (also consistent with structure (Ia)):

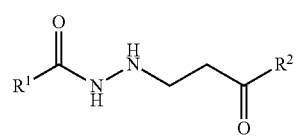

(V)

For example, the hydrazide functional material may comprise a methylolated hydrazide, and the methylolated hydrazide may have the following structure (VI):

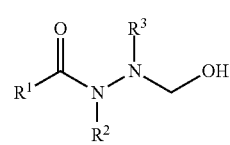

(VI)

It will be appreciated that $R^2$ and/or $R^3$ from structure (VI) may also comprise a methylol group. It will be appreciated that at least one of $R^2$, $R^3$, and $R^4$ from structure (Ia) may comprise a methylol group. It will be appreciated that $R^2$ from structure (Ib) may comprise a methylol group.

The hydrazide functional material may comprise a terminal and/or an internal hydrazide functional group. A terminal hydrazide functional group is a hydrazide functional group from structure (Ia) or (Ib) located at a terminal location of the hydrazide functional material. An internal hydrazide functional group is a hydrazide functional group from structure (Ia) or (Ib) located at a non-terminal location along the backbone of the hydrazide functional material.

The present invention is directed to a film-forming thermoset coating composition (hereinafter the "coating composition") including: (a) an aqueous medium; and Option 1 and/or Option 2 as follows: Option 1: (b1) polyurethane-acrylate core-shell particles including a polymeric acrylic core at least partially encapsulated by a polymeric shell including urethane linkages, where the polymeric shell includes an acid functional group and two or more hydrazide functional groups, where the polymeric shell is covalently bonded to at least a portion of the polymeric core; and (c1) (i) formaldehyde; (ii) polyformaldehyde; and/or (iii) a compound that generates formaldehyde; Option 2: (b2) polyurethane-acrylate core-shell particles including a polymeric acrylic core at least partially encapsulated by a polymeric shell including urethane linkages, where the polymeric shell includes an acid functional group and two or more N-methylolated hydrazide functional groups, where the polymeric shell is covalently bonded to at least a portion of the polymeric core.

The coating composition includes an aqueous medium. As used herein, an "aqueous medium" refers to a liquid medium comprising at least 50 weight % water, based on the total weight of the liquid medium, where the liquid medium is defined as water and organic solvents which are liquid at room temperature (20° C.) and volatile at 110° C. as defined by ASTM D2369-93. As such, it will be appreciated that the liquid medium basis does not include diluents which are liquid at ambient temperature but not volatile at 110° C. as defined by ASTM D2369-93. Such aqueous liquid mediums can for example comprise at least 60 weight % water, or at least 70 weight % water, or at least 80 weight % water, or at least 90 weight % water, or at least 95 weight % water, or 100 weight % water, based on the total weight of the liquid medium. The solvents that, if present, make up less than 50 weight % of the liquid medium include organic solvents. Non-limiting examples of suitable organic solvents include polar organic solvents, e.g. protic organic solvents such as glycols, glycol ether alcohols, alcohols, volatile ketones, glycol diethers, esters, and diesters. Other non-limiting examples of organic solvents include aromatic and aliphatic hydrocarbons.

The coating composition may include the components of Option 1, the components of Option 2, or a combination thereof.

According to Option 1, the coating composition includes (b1) polyurethane-acrylate core-shell particles comprising a polymeric acrylic core at least partially encapsulated by a polymeric shell comprising urethane linkages, wherein the polymeric shell comprises an acid functional group and two or more hydrazide functional groups, wherein the polymeric shell is covalently bonded to at least a portion of the polymeric core; and (c1) (i) formaldehyde; (ii) polyformaldehyde; and/or (iii) a compound that generates formaldehyde.

The polymeric core and/or the polymeric shell of the (b1) polyurethane-acrylate core-shell particles can comprise one or more, such as two or more, reactive functional groups. The term "reactive functional group" refers to an atom, group of atoms, functionality, or group having sufficient reactivity to form at least one covalent bond with another co-reactive group in a chemical reaction. Suitable reactive functional groups that can be formed on the polymeric shell and/or polymeric core include carboxylic acid groups, amine groups, epoxide groups, hydrazide groups, hydroxyl groups, thiol groups, carbamate groups, amide groups, urea groups, isocyanate groups (including blocked isocyanate groups), ethylenically unsaturated groups, or a combination thereof. As used herein, "ethylenically unsaturated" refers to a group having at least one carbon-carbon double bond.

The (b1) polyurethane-acrylate core-shell particles comprise a polymeric acrylic core at least partially encapsulated by a polymeric shell comprising urethane linkages. The polymeric shell comprises an acid functional group and two or more hydrazide functional groups. The polymeric shell is covalently bonded to at least a portion of the polymeric core. As used herein, "polymeric core" means that the core of the core-shell particle comprises one or more polymers, and a "polymeric shell" means that the shell of the core-shell particle comprises one or more polymers. Further, the core-shell particles can have various shapes (or morphologies) and sizes. The core-shell particles can have generally spherical, cubic, platy, polyhedral, or acicular (elongated or fibrous) morphologies. The core-shell particles (b1) can also have an average particle size of 30 to 300 nanometers, or from 40 to 200 nanometers, or from 50 to 150 nanometers. As used herein, "average particle size" refers to volume average particle size. The average particle size is determined with a Zetasize 3000HS following the instructions in the Zetasize 3000HS manual.

The polymeric acrylic core of the (b1) polyurethane-acrylate core-shell particles can comprise an addition polymer formed from ethylenically unsaturated monomers, and suitable ethylenically unsaturated groups include, but are not limited to, (meth)acrylate groups, vinyl groups, or a combination thereof. As used herein, the term "(meth)acrylate" refers to both the methacrylate and the acrylate.

The polymeric shell of the (b1) polyurethane-acrylate core-shell particles comprise urethane linkages and comprise an acid functional group and two or more hydrazide functional groups.

The backbone or main chain of a polymer that forms at least a portion of the polymeric shell comprises urethane linkages and, optionally, other linkages. The backbone or main chain of a polymer that forms at least a portion of the polymeric shell may comprise urea linkages. For instance, the polymeric shell can comprise a polyurethane with a backbone that includes urethane linkages (—NH—C(=O)—O—) and optionally urea linkages (—NH—C(=O)—NH—). The polymeric shell can also comprise additional linkages including, but not limited to, ester linkages, ether linkages, or a combination thereof.

The core-shell particles can be prepared to provide a hydrophilic polymeric shell with enhanced water-dispersibility/stability and a hydrophobic polymeric core. As such, the polymeric shell can comprise hydrophilic water-dispersible groups while the polymeric core can be free of hydrophilic water-dispersible groups. The hydrophilic water-dispersible groups can increase the water-dispersibility/stability of the polymeric shell in the aqueous medium so that the polymeric shell at least partially encapsulates the hydrophobic core.

The water-dispersible groups can be formed from hydrophilic functional groups. The polymeric shell comprises carboxylic acid functional groups, such as by using a carboxylic acid group containing diols to form the polymeric shell. The carboxylic acid functional groups can be at least partially neutralized to form a salt (i.e., at least 30 percent of the total neutralization equivalent) by an organic or inorganic base, such as a volatile amine, to form a salt group. The amine may comprise a primary amine, a secondary amine, a tertiary amine, or a combination thereof. Suitable amines include ammonia, dimethylamine, trimethylamine, triethylamine, monoethanolamine, and dimethylethanolamine. It is appreciated that the amines may at least partially evaporate during the formation of the coating to expose the carboxylic acid functional groups and allow the carboxylic acid functional groups to undergo further reactions such as with a crosslinking agent reactive with the carboxylic acid functional groups. Other water-dispersible groups that may be present in the polymeric shell include polyoxyalkylene groups.

The polymeric shell may include a polyurethane with two or more hydrazide functional groups as well as at least one pendant and/or terminal carboxylic acid functional group. The hydrazide functional groups may be pendant (e.g., on the polyurethane shell) and/or terminal (e.g., on the backbone of the polyurethane shell) and/or internal such as to be positioned in the polymeric backbone at a non-terminal location (e.g., of the polyurethane shell). The polyurethane-acrylate core-shell particles, such as the shell thereof, may comprise internal hydrazide functional groups that provide at least 2 secondary amino groups on the polyurethane-acrylate core-shell particles. The secondary amino groups may be reactive with formaldehyde. The carboxylic acid functional groups can be at least partially neutralized to form a salt (i.e., at least 30 percent of the total neutralization equivalent) by an organic or inorganic base, such as a volatile amine, to form a salt group. A "pendant group" refers to a group that is an offshoot from the side of the polymer backbone and which is not part of the polymer backbone. In contrast, a "terminal group" refers to a group on an end of the polymer backbone and which is part of the polymer backbone.

Various components can be used to form the polymeric shell. The polymeric shell can for example be formed from isocyanate functional polyurethane prepolymers, polyamines, and ethylenically unsaturated monomers. As used herein, a "prepolymer" refers to a polymer precursor capable of further reactions or polymerization by one or more reactive groups to form a higher molecular mass or cross-linked state. The isocyanate functional polyurethane prepolymers can be prepared according to any method known in the art, such as by reacting at least one polyisocyanate with one or more compound(s) having functional groups that are reactive with the isocyanate functionality of the polyisocyanate. Reactive functional groups can be active hydrogen-containing functional groups such as hydroxyl groups, thiol groups, amine groups, and acid groups like carboxylic acid groups. A hydroxyl group may react with an isocyanate group to form a urethane linkage. A primary or secondary amine group may react with an isocyanate group to form a urea linkage. Suitable compounds that can be used to form the polyurethane include, but are not limited to, polyols, polyisocyanates, compounds containing carboxylic acids such as diols containing carboxylic acids, polyamines, hydroxyl functional ethylenically unsaturated components such as hydroxyalkyl esters of (meth)acrylic acid, and/or other compounds having reactive functional groups, such as hydroxyl groups, thiol groups, amine groups, hydrazide groups, and carboxylic acids.

Suitable polyisocyanates include isophorone diisocyanate (IPDI), dicyclohexylmethane 4,4'-diisocyanate (H12MDI), cyclohexyl diisocyanate (CHDI), m-tetramethylxylylene diisocyanate (m-TMXDI), p-tetramethylxylylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, 1,4-methylene bis-(cyclohexyl isocyanate), toluene diisocyanate (TDI), m-xylylenediisocyanate (MXDI) and p-xylylenediisocyanate, 4-chloro-1,3-phenylene diisocyanate, 1,5-tetrahydro-naphthalene diisocyanate, 4,4'-dibenzyl diisocyanate, and 1,2,4-benzene triisocyanate, xylylene diisocyanate (XDI), and mixtures or combinations thereof.

Suitable polyols that can be used to prepare the polyurethane based polymer include, but are not limited to, lower molecular weight (lower than 2,000 Mn) glycols (number average molecular weight (Mn) and weight average molecular weight (Mw), as reported herein, are measured by gel permeation chromatography using a polystyrene standard according to ASTM D6579-11 performed using a Waters 2695 separation module with a Waters 2414 differential refractometer (RI detector); tetrahydrofuran (THF) was used as the eluent at a flow rate of 1 ml/min, and two PLgel Mixed-C (300×7.5 mm) columns were used for separation at the room temperature; weight and number average molecular weight of polymeric samples can be measured by gel permeation chromatography relative to linear polystyrene standards of 800 to 900,000 Da), polyether polyols, polyester polyols, copolymers thereof, or a combination thereof. Suitable low molecular weight glycols include ethylene glycol, diethylene glycol, triethylene glycol, 1,2-propylene glycol, 1,3-butylene glycol, tetramethylene glycol, hexamethylene glycol, or a combination thereof, as well as other compounds that comprise two or more hydroxyl groups or a combination of any of the foregoing. Suitable polyether polyols include polytetrahydrofuran, polyethylene glycol, polypropylene glycol, polybutylene glycol, or a combination thereof. Suitable polyester polyols include those prepared from a polyol comprising an ether moiety and a carboxylic acid or anhydride.

Other suitable polyols include, but are not limited to, 1,6-hexanediol, cyclohexanedimethanol, 2-ethyl-1,6-hexanediol, 1,4-butanediol, ethylene glycol, propylene glycol, 1,3-propanediol, 1,4-butanediol, neopentyl glycol, trimethylol propane, 1,2,6-hexantriol, glycerol, or a combination thereof. Further, suitable amino alcohols that can be used include, but are not limited to, ethanolamine, propanolamine, butanolamine, or a combination thereof.

Suitable carboxylic acids, which can be reacted with the polyols to form a polyester polyol, include, but are not limited to, glutaric acid, succinic acid, malonic acid, oxalic acid, trimellitic acid, phthalic acid, isophthalic acid, hexahydrophthalic acid, adipic acid, maleic acid, anhydrides thereof, or mixtures thereof. Further, suitable acid containing diols include, but are not limited to, 2,2-bis(hydroxymethyl)propionic acid which is also referred to as dimethylolpropionic acid (DMPA), 2,2-bis(hydroxymethyl)butyric acid which is also referred to as dimethylol butanoic acid (DMBA), diphenolic acid, or a combination thereof. Maleic acid (and/or its anhydride) may be reacted with at least one polyol to form a polyester polyol segment, such that the resulting polyurethane-based polymeric shell comprises an internal maleate functional group thereon, such that the maleate functional group is located on the backbone of the polyurethane shell at a non-terminal location.

Suitable hydroxyalkyl esters of (meth)acrylic acid include hydroxymethyl (meth)acrylate, hydroxyethyl (meth)acrylate, hydroxypropyl (meth)acrylate, hydroxybutyl (meth) acrylate, or a combination thereof.

The components that form the polyurethane prepolymer can be reacted in a stepwise manner, or they can be reacted simultaneously. The polyurethane prepolymer can be formed by reacting a polyisocyanate (e.g., a diisocyanate or a triisocyanate), a polyol, a carboxyl group-containing diol, and a hydroxyl group-containing ethylenically unsaturated monomer. The polyurethane prepolymer can be formed by reacting a polyisocyanate (e.g., a diisocyanate or a triisocyanate), a polyol, a hydrazide functional monomer and/or an amine, a carboxyl group-containing diol, and a hydroxyl group-containing ethylenically unsaturated monomer.

After forming the water-dispersible isocyanate functional polyurethane prepolymer, the polyurethane prepolymer is reacted with a polyhydrazide compound to form a water-dispersible polyhydrazide functional polyurethane. The polyhydrazide compounds can also chain extend and/or terminally cap the isocyanate functional polyurethane prepolymer and introduce hydrazide functionality thereon. Non-limiting examples of polyhydrazide compounds that can be reacted with the isocyanate functional polyurethane prepolymer include a material or compound having two or more hydrazide functional groups per molecule. The hydrazide component can be chosen from non-polymeric polyhydrazides, polymeric polyhydrazides, or combinations thereof. Non-limiting examples of suitable non-polymeric polyhydrazides include maleic acid dihydrazide, fumaric acid dihydrazide, itaconic acid dihydrazide, phthalic acid dihydrazide, isophthalic acid dihydrazide, terephthalic acid dihydrazide, trimellitic acid trihydrazide, oxalic acid dihydrazide, adipic acid dihydrazide, sebacic acid dihydrazide, and combinations thereof.

The polymeric polyhydrazides can include various types of polymers comprising two or more hydrazide functional groups. For example, the polymeric polyhydrazide can comprise a polyurethane having two or more hydrazide groups. The polyhydrazide functional polyurethane can be prepared by first forming a water-dispersible isocyanate functional polyurethane prepolymer. Such water-dispersible isocyanate functional polyurethane prepolymers can be prepared by reacting polyols, isocyanates, compounds containing carboxylic acids such as diols containing carboxylic acids and, optionally, polyamines. Non-limiting examples of these compounds include any of those previously described.

The polyhydrazide functional core-shell particles that can be used according to the present invention can for example be prepared by reacting polyurethane prepolymers having isocyanate and ethylenically unsaturated groups with polyhydrazide compounds to form polyurethanes having hydrazide and ethylenically unsaturated groups. The polyurethanes having hydrazide and ethylenically unsaturated groups are then polymerized in the presence of ethylenically unsaturated monomers and/or polymers to form the core-shell particles. The resulting core-shell particles will comprise a polymeric core prepared from polymerized ethylenically unsaturated monomers and/or polymers (i.e. a core comprising acrylic polymer, a vinyl polymer, or a combination thereof) that is covalently bonded to at least a portion of a polyurethane shell having hydrazide functional groups and urethane linkages. The polymeric shell also includes carboxylic acid functional groups and optionally urea linkages as previously described.

When the polyhydrazide functional core-shell particles are prepared, the resulting mixture may comprises excess residual unreacted hydrazide monomer (e.g., adipic acid dihydrazide). The use of excess hydrazide may result in the polyurethane shell comprising at least one terminal hydrazide functional group. Moreover, some residual unreacted hydrazide monomer may remain in the mixture, which can participate in a curing reaction with formaldehyde.

The polyurethane prepolymers can also be prepared in the presence of catalysts, polymerization inhibitors, or a combination thereof. Suitable catalysts include triethylamine, N-ethyl morpholine, triethyldiamine, and the like, as well as tin type catalysts such as dibutyl tin dilaurate, dioctyl tin dilaurate, and the like. Polymerization inhibitors that can be used to prevent polymerization of the ethylenically unsaturated compounds during formation of the polyurethane include hydroquinone, hydroquinone monomethyl ether, p-benzoquinone, and the like.

The polymeric shell can also optionally be prepared with non-hydrazide containing polyamines (as polyhydrazides are a class of polyamine) and ethylenically unsaturated monomers not incorporated into the polyurethane prepolymer during preparation thereof. The non-hydrazide containing polyamine or polyhydrazide may be formed as a reaction product of an amine or hydrazide with an ethylenically unsaturated monomer. The isocyanate functional polyurethane prepolymers can be prepared as described above and then reacted with polyhydrazides compounds and optionally non-hydrazide containing polyamines as chain extenders. As used herein, a "chain extender" refers to a lower molecular weight (Mn less than 2000) compound having two or more functional groups that are reactive towards isocyanate.

Suitable non-hydrazide containing polyamines that can be used to prepare the polyurethane based polymer include aliphatic and aromatic compounds, which comprise two or more amine groups selected from primary and secondary amine groups, such as, but not limited to, diamines such as ethylenediamine, hexamethylenediamine, 1,2-propanediamine, 2-methyl-1,5-penta-methylenediamine, 2,2,4-trimethyl-1,6-hexanediamine, isophoronediamine, diaminocyclohexane, xylylenediamine, 1,12-diamino-4,9-dioxadodecane, or a combination thereof. Suitable polyamines are also sold by Huntsman Corporation (The Woodlands, Tex.) under the trade name JEFFAMINE, such as JEFFAMINE D-230 and JEFFAMINE D-400.

Suitable non-hydrazide containing polyamine functional compounds include the Michael addition reaction products of a polyamine functional compound, such as a diamine. The non-hydrazide containing polyamine functional compound may comprise at least two primary amino groups (i.e., a functional group represented by the structural formula —$NH_2$). The resulting Michael addition reaction products can include a compound with at least two secondary amino groups (i.e., a functional group represented by the structural formula —NRH in which R is an organic group. It is appreciated that the secondary amino groups may react with the isocyanate functional groups of the polyurethane prepolymers to form urea linkages and chain extend the polyurethanes.

After reacting the polyurethane prepolymers and polyhydrazide and optional non-hydrazide containing polyamine chain extenders, the chain extended polyurethane and additional ethylenically unsaturated monomers can be subjected to a polymerization process to form the core-shell particles. The additional ethylenically unsaturated monomers can be added after forming the polyurethane. Alternatively, the additional ethylenically unsaturated monomers can be used as a diluent during preparation of the polyurethane prepolymer and not added after formation of the polyurethane. It is appreciated that ethylenically unsaturated monomers can be used as a diluent during preparation of the polyurethane prepolymer and also added after formation of the polyurethane.

The additional ethylenically unsaturated monomers can comprise multi-ethylenically unsaturated monomers, mono-ethylenically unsaturated monomers, or a combination thereof. A "mono-ethylenically unsaturated monomer" refers to a monomer comprising only one ethylenically unsaturated group, and a "multi-ethylenically unsaturated monomer" refers to a monomer comprising two or more ethylenically unsaturated groups.

Suitable ethylenically unsaturated monomers include, but are not limited to, alkyl esters of (meth)acrylic acid, hydroxyalkyl esters of (meth)acrylic acid, acid group containing unsaturated monomers, vinyl aromatic monomers, or a combination thereof.

Suitable alkyl esters of (meth)acrylic acid include methyl (meth)acrylate, ethyl (meth)acrylate, butyl (meth)acrylate, isobutyl (meth)acrylate, ethylhexyl (meth)acrylate, lauryl (meth)acrylate, octyl (meth)acrylate, glycidyl (meth)acrylate, isononyl (meth)acrylate, isodecyl (meth)acrylate, vinyl (meth)acrylate, acetoacetoxyethyl (meth)acrylate, acetoacetoxypropyl (meth)acrylate, or a combination thereof. Other suitable alkyl esters include, but are not limited to, di(meth) acrylate alkyl diesters formed from the condensation of two equivalents of (meth)acrylic acid such as ethylene glycol di(meth)acrylate. Di(meth)acrylate alkyl diesters formed from $C_{2-24}$ diols such as butane diol and hexane diol can also be used.

Suitable hydroxyalkyl esters of (meth)acrylic acid and include any of those previously described. Suitable acid group containing unsaturated monomers include (meth) acrylic acid, itaconic acid, maleic acid, fumaric acid, crotonic acid, aspartic acid, malic acid, mercaptosuccinic acid, or a combination thereof.

Suitable vinyl aromatic monomers include styrene, 2,4-dimethylstyrene, ethylstyrene, isopropylstyrene, butylstyrene, vinyl naphthalene, vinyl toluene, divinyl aromatic monomers such as divinyl benzene, or a combination thereof.

As previously noted, the ethylenically unsaturated monomers can be polymerized in the presence of the polyurethane, which can also contain ethylenically unsaturated groups, to form the core-shell particles. The polymerization can be conducted using art recognized techniques as well as conventional additives such as emulsifiers, protective colloids, free radical initiators, and chain transfer agents known in the art.

The polymeric shell is covalently bonded to at least a portion of the polymeric core. For example, the polymeric shell can be covalently bonded to the polymeric core by reacting at least one functional group on the monomers and/or prepolymers that are used to form the polymeric shell with at least one functional group of the monomers and/or prepolymers that are used to form the polymeric core. The functional groups can include any of the functional groups previously described provided that at least one functional group of the monomers and/or prepolymers that are used to form the polymeric shell is reactive with at least one functional group of the monomers and/or prepolymers that are used to form the polymeric core. For instance, the monomers and/or prepolymers that are used to form the polymeric shell and polymeric core can both comprise at least one ethylenically unsaturated group that are reacted with each other to form a chemical bond.

The coating composition may comprise from 10 to 90 weight percent of the (b1) polyurethane-acrylate core-shell particles based on total resin solids of the coating composition, such as from 20 to 80 weight percent, from 30 to 70 weight percent, from 40 to 60 weight percent, or from 50 to 60 weight percent.

According to Option 1, in addition to the above-described (b1) polyurethane-acrylate core-shell particles, the coating composition includes (c1): formaldehyde, polyformaldehyde, a compound that generates formaldehyde, or a combination thereof. The component (c1) may be reactive in situ in the coating composition with the hydrazide functional groups on the polymeric shell of the (b1) polyurethane-acrylate core-shell particles.

The compound that generates formaldehyde may include a melamine formaldehyde resin. As used herein, a "melamine formaldehyde resin" refers to a resin with at least one melamine ring terminated with multiple hydroxyl groups derived from formaldehyde. The melamine formaldehyde resin may generate formaldehyde in the presence of heat and/or a catalyst. The melamine formaldehyde resin may contain and/or generate formaldehyde in an amount of 0.1 to 3 weight %, based on total resin solids of the coating composition. The coating composition may comprise from 0 to 50 weight %, such as from 5 to 50 weight % or from 10 to 30 weight % of the melamine formaldehyde resin, based on total resin solids of the coating composition. The coating composition may comprise up to 50 weight %, such as up to 40 weight % or up to 30 weight % of the melamine formaldehyde resin, based on total resin solids of the coating composition. The coating composition may comprise at least 5 weight %, such as at least 10 weight % of the melamine formaldehyde resin, based on total resin solids of the coating composition.

The total amount of formaldehyde present and/or generated in (c1) in the coating composition may range of 0.1 to 3 weight %, based on total resin solids of the coating composition.

According to Option 2, the coating composition includes (b2) polyurethane-acrylate core-shell particles comprising a polymeric acrylic core at least partially encapsulated by a polymeric shell comprising urethane linkages, wherein the polymeric shell comprises an acid functional group and two or more N-methylolated hydrazide functional groups, wherein the polymeric shell is covalently bonded to at least a portion of the polymeric core.

The (b2) polyurethane-acrylate core-shell particles may be made in a similar way and have similar properties compared to the (b1) polyurethane-acrylate core-shell particles (as described above) except that the (b1) polyurethane-acrylate core-shell particles (the hydrazide functional groups thereof) are pre-reacted (prior to inclusion in the coating composition) with formaldehyde and/or polyformaldehyde and/or formaldehyde from the compound that generates formaldehyde to form the two or more N-methylolated hydrazide functional groups in the (b2) polyurethane-acrylate core-shell particles. The (b1) polyurethane-acrylate core-shell particles may be mixed with the formaldehyde and aged for a time period to form the N-methylolated hydrazide functional groups in the (b2) polyurethane-acrylate core-shell particles before inclusion in the coating composition. The mixture may be aged for any suitable time period, such as 24 hours. The mixture may be aged at elevated temperatures (relative to room temperature (20C°–27° C.)), such as 40° C.

The formaldehyde and/or polyformaldehyde and/or formaldehyde from the compound that generates formaldehyde may be added in amount such that not all hydrazide groups are reacted therewith (e.g., by a stoichiometric excess of hydrazide). The formaldehyde and/or polyformaldehyde and/or formaldehyde from the compound that generates formaldehyde may be added in amount such that substantially all (>95%) or all hydrazide groups are reacted therewith (e.g., by including a stoichiometric excess of formaldehyde). The stoichiometric ratio of formaldehyde to hydrazide may be 1:1 or may range from 2:1 to 1:2, such as 1.5:1 to 1:1.5.

The coating composition may comprise from 10 to 90 weight percent of the (b2) polyurethane-acrylate core-shell particles based on total resin solids of the coating composition, such as from 20 to 80 weight percent, from 30 to 70 weight percent, from 40 to 60 weight percent, or from 50 to 60 weight percent.

The coating composition may be prepared according to both Option 1 and Option 2 so as to include (b1) polyurethane-acrylate core-shell particles comprising a polymeric acrylic core at least partially encapsulated by a polymeric shell comprising urethane linkages, wherein the polymeric shell comprises an acid functional group and two or more hydrazide functional groups, wherein the polymeric shell is covalently bonded to at least a portion of the polymeric core, and (c1) (i) formaldehyde; (ii) polyformaldehyde; and/or (iii) a compound that generates formaldehyde, and (b2) polyurethane-acrylate core-shell particles comprising a polymeric acrylic core at least partially encapsulated by a polymeric shell comprising urethane linkages, wherein the polymeric shell comprises an acid functional group and two or more N-methylolated hydrazide functional groups, wherein the polymeric shell is covalently bonded to at least a portion of the polymeric core.

The polyurethane-acrylate core-shell particles (b1) and/or (b2) may comprise a polyurethane polymer, an acrylic polymer, a polyester polymer, or some combination thereof. For example, the polyurethane-acrylate core-shell particles (b1) and/or (b2) may include a polymeric acrylic core having a polymeric polyurethane shell.

The polyurethane-acrylate core-shell particles (b1) and/or (b2) may comprise aliphatic and/or aromatic rings.

The polyurethane-acrylate core-shell particles (b1) and/or (b2) may comprise a polyurethane polymer, an acrylic polymer, a polyester polymer, or a combination thereof. For example, the polyurethane-acrylate core-shell particles (b1) and/or (b2) may comprises a polyurethane shell and an acrylic core. The shell and/or the core may comprise a polyurethane polymer. The shell and/or the core may comprise an acrylic polymer. The shell and/or the core may comprise a polyester polymer.

The coating composition may further comprise a polyester polymer. The polyester polymer may be obtained from components comprising polytetrahydrofuran and a carboxylic acid or anhydride thereof. The polyester polymer may comprise a hydroxyl functional group.

The carboxylic acid or anhydride used to form the polyester polymer can be selected from various types of polycarboxylic acids or the anhydrides thereof, such as from a dicarboxylic acid or anhydride thereof, or from a polycarboxylic acid having three or more carboxylic acid groups or the anhydrides thereof. The carboxylic acid or anhydride thereof can also be selected from compounds having aromatic rings or aliphatic structures. As used herein, an "aromatic group" refers to a cyclically conjugated hydrocarbon with a stability (due to delocalization) that is significantly greater than that of a hypothetical localized structure. Further, the term "aliphatic" refers to non-aromatic straight, branched, or cyclic hydrocarbon structures that contain saturated carbon bonds.

Non-limiting examples of carboxylic acids used to form the polyester polymer include any of those previously listed. As indicated, an anhydride can be used, such as an anhydride of any of the previously described carboxylic acids. The carboxylic acid or anhydride may comprise trimellitic acid and/or anhydride. Non-limiting examples of such anhydrides include trimellitic anhydride, phthalic anhydride, maleic anhydride, succinic anhydride, malonic anhydride, oxalic anhydride, hexahydrophthalic anhydride, adipic anhydride, and combinations thereof.

As indicated, the carboxylic acid or anhydride thereof can be selected from compounds having aromatic rings or aliphatic structures. For instance, the carboxylic acid or anhydride thereof can be selected from an aromatic compound in which the carboxylic acid or anhydride functional groups are bonded directly to the aromatic ring(s) such that there is no interrupting atoms between the aromatic ring(s) and the attached carboxylic acid or anhydride functional groups (a non-limiting example being trimellitic anhydride).

The polyester polymer can also be prepared with other components in addition to the previously described polytetrahydrofuran and carboxylic acid or anhydride thereof. Non-limiting examples of additional components that can be used to form the polyester polymer include polyols in addition to the polytetrahydrofuran, additional compounds containing one or more carboxylic acid groups or anhydrides thereof, ethylenically unsaturated compounds, polyisocyanates, and combinations thereof.

Non-limiting examples of polyols used to form the polyester polymer include glycols, polyether polyols, polyester polyols, copolymers thereof, and combinations thereof. Non-limiting examples of glycols include ethylene glycol, diethylene glycol, triethylene glycol, 1,2-propylene glycol, 1,3-butylene glycol, tetramethylene glycol, hexamethylene glycol, and combinations thereof, as well as other compounds that comprise two or more hydroxyl groups and combinations of any of the foregoing. Non-limiting examples of suitable polyether polyols in addition to the polytetrahydrofuran include polyethylene glycol, polypropylene glycol, polybutylene glycol, and combinations thereof.

Other suitable polyols used to form the polyester polymer include any of those previously listed. It is appreciated that the polyol can be selected from diols and/or from compounds having 3 or more hydroxyl groups.

The additional compounds containing one or more carboxylic acid groups or anhydrides can used to form the polyester polymer include any of the previously described carboxylic acids and anhydrides provided that the additional compound is different from the first carboxylic acid or anhydride. For instance, the components that form the polyester polymer can include both trimellitic anhydride and maleic anhydride.

Non-limiting examples of ethylenically unsaturated monomers, including those containing an acid group, used to form the polyester polymer include any of those previously listed. Non-limiting examples of vinyl aromatic monomers used to form the polyester polymer include any of those previously listed. Non-limiting examples of suitable polyisocyanates used to form the polyester polymer include any of those previously listed.

It is appreciated that the previously described optional additional components can be used to modify or adjust the properties of the polyester polymer and the final coating formed therewith. For instance, the polyester polymer can be formed with additional components, such as an additional polyol, that can provide a faster cure at lower bake temperatures such as temperatures of 80° C. or lower.

The polytetrahydrofuran used to form the polyester polymer can comprise greater than 20 weight % of the components that form the polyester polymer, or greater than 30 weight % of the components that form the polyester polymer, or greater than 40 weight % of the components that form the polyester polymer. The polytetrahydrofuran can also comprise up to 50 weight % of the components that form the polyester polymer, or up to 60 weight % of the components that form the polyester polymer, or up to 70 weight % of the components that form the polyester polymer, or up to 80 weight % of the components that form the polyester polymer, or up to 90 weight % of the components that form the polyester polymer. The polytetrahydrofuran can further comprise an amount within a range such as from 20 weight % to 90 weight % of the components that form the polyester polymer, or from 40 weight % to 80 weight % of the components that form the polyester polymer, or from 50 weight % to 70 weight % of the components that form the polyester polymer, or from 30 weight % to 40 weight % of the components that form the polyester polymer.

The carboxylic acid or anhydride used to form the polyester polymer can comprise greater than 5 weight % of the components that form the polyester polymer, or greater than 8 weight % of the components that form the polyester polymer. The carboxylic acid or anhydride can also comprise up to 20 weight % of the components that form the polyester polymer, or up to 15 weight % of the components that form the polyester polymer, or up to 12 weight % of the components that form the polyester polymer. The carboxylic acid or anhydride can further comprise an amount within a range such as from 5 weight % to 20 weight % of the components that form the polyester polymer, or from 8 weight % to 15 weight % of the components that form the polyester polymer, or from 8 weight % to 12 weight % of the components that form the polyester polymer, or from 7 weight % to 10 weight % of the components that form the polyester polymer.

It is appreciated that one or more of the previously described additional components can make up the remaining amount of components used to form the polyester polymer. For example, the polyester polymer can be prepared with polytetrahydrofuran, a carboxylic acid or anhydride, a polyol that is different from the polytetrahydrofuran, and another carboxylic acid or anhydride that is different from the first carboxylic acid or anhydride.

The resulting polyester polymer prepared from the previously described components may comprise ether linkages and/or carboxylic acid functional groups. The polyester polymer can also comprise urethane linkages as well as additional functional groups such as hydroxyl functional groups. For instance, the polyester polymer can comprise ether linkages, ester linkages, carboxylic acid functional groups, and hydroxyl functional groups. The polyester polymer can also comprise additional linkages and functional groups including, but not limited to, the previously described additional functional groups.

The polyester polymer can have an acid value of at least 15, at least 20, at least 30, at least 35, or at least 40, based on the total resin solids of the polyester polymer. The polyester polymer can have an acid value of up to 60, up to 55, up to 50, up to 45, up to 40, up to 35, or up to 30, based on the total resin solids of the polyester polymer. The polyester polymer can have an acid value ranging from 15 to 60, such as from 20 to 30, from 20 to 50, from 20 to 60, from 30 to 50, from 30 to 60, from 35 to 60, from 35 to 50, from 40 to 50, or from 40 to 60, based on the total resin solids of the polyester polymer. The acid value is measured as described in the Examples.

The acid functionality of the polyester polymer can have a pKa of less than 5, or less than 4, or less than 3.5, or less than 3, or less than 2.5, or less than 2. The acid functionality of the polyester polymer can be within a pKa range such as for example from 1.5 to 4.5. The pKa value is the negative (decadic) logarithms of the acidic dissociation constant, and is determined according to the titration method described in Lange's Handbook of Chemistry, 15th edition, section 8.2.1.

The carboxylic acid functionality found on the polyester polymer can be provided by the first carboxylic acid or anhydride only. Alternatively, when additional carboxylic acid functional compounds and/or anhydrides are used to form the polymer, the carboxylic acid functionality found on the polymer is provided by the first carboxylic acid or anhydride and the additional carboxylic acid functional compounds and/or anhydrides.

The polyester polymer can also comprise a hydroxyl equivalent weight of from 1500 to 5000, or from 2000 to 3000, as measured by reacting the dried polyester polymer with an excess amount of acetic anhydride and titrating with potassium hydroxide.

The coating composition may include from 5 to 50 weight percent of the polyester polymer based on total resin solids of the coating composition, such as from 5 to 40 weight percent, from 5 to 30 weight percent, from 5 to 20 weight percent, from 10 to 40 weight percent, from 10 to 30 weight percent, or from 10 to 20 weight percent.

The coating composition may further comprise a polymer reactive with (b1), (b2), and/or (c1). The polymer may be obtained from components comprising N-(hydroxymethyl)acrylamide, N-(isobutoxymethyl)acrylamide, or a combination thereof.

In addition, the coating composition can comprise additional materials including, but not limited to, optional additional resins such as additional film-forming resins.

The additional resin can include any of a variety of thermoplastic and/or thermosetting film-forming resins known in the art. The term "thermosetting" refers to resins that "set" irreversibly upon curing or crosslinking, wherein the polymer chains of the resins are joined together by covalent bonds. Once cured or crosslinked, a thermosetting resin will not melt upon the application of heat and is insoluble in solvents. As noted, the film-forming resin can also include a thermoplastic film-forming resin. The term "thermoplastic" refers to resins wherein the polymer chains are not joined together by covalent bonds and, thereby, can undergo liquid flow upon heating and can be soluble in certain solvents.

Suitable additional resins include polyurethanes other than those previously described, polyesters (e.g., polyester polyols), polyamides, polyethers, polysiloxanes, fluoropolymers, polysulfides, polythioethers, polyureas, (meth)acrylic resins (e.g., acrylic dispersions), epoxy resins, vinyl resins, copolymers thereof, or mixtures thereof. The additional resin may include a core-shell particle different from those previously described. The additional resin may include a non-core-shell particle resin. The additional resin may include a grind resin used to introduce pigment into the coating composition.

The additional resin can have any of a variety of reactive functional groups including, but not limited to, carboxylic acid groups, amine groups, epoxide groups, hydroxyl groups, thiol groups, carbamate groups, amide groups, urea groups, isocyanate groups (including blocked isocyanate groups), (meth)acrylate groups, and combinations thereof. Thermosetting coating compositions typically comprise a crosslinker that may be selected from any of the crosslinkers known in the art to react with the functionality of the resins used in the coating compositions. Alternatively, a thermosetting film-forming resin can be used having functional groups that are reactive with themselves; in this manner, such thermosetting resins are self-crosslinking.

The coating composition may include the optional additional resin. When the optional additional resin is included in the coating composition, the coating composition may include from 5 to 40 weight percent of the additional resin based on total resin solids, such as from 5 to 30 weight percent, from 5 to 20 weight percent, from 10 to 40 weight percent, from 10 to 30 weight percent, from 20 to 30 weight percent, or from 15 to 30 weight percent. The coating composition may include up to 40 weight percent of the additional resin based on total resin solids, such as up to 30 weight percent, up to 20 weight percent, or up to 10 weight percent.

The coating composition may comprise an acid catalyst. The acid catalyst may be a separate component from the polyurethane-acrylate core-shell particles (b1) and/or (b2), such as a phosphoric or phosphonic or sulfonic acid catalyst. Non-limiting examples include phenyl phosphonic acid, 2-ethylhexyl acid phosphate, dodecyl benzene sulfonic acid, para-toluene sulfonic acid, or a combination thereof. The separate acid catalyst component may comprises a separate polymer (different from the polyurethane-acrylate core-shell particles (b1) and/or (b2)) comprising the acid catalyst, such as an acrylic polymer comprising an acid catalyst or an epoxy resin comprising an acid catalyst (e.g., a phosphatized acrylic or phosphatized epoxy resin). The acid catalyst may be bonded to the polyurethane-acrylate core-shell particles (b1) and/or (b2), such as carboxylic acid. For example, the polyurethane-acrylate core-shell particles (b1) and/or (b2) may comprise a phosphonic and/or sulfonic acid acrylate core.

The acid catalyst may comprise carboxylic acid functional groups formed on the polyurethane-acrylate core-shell particles (b1) and/or (b2). The carboxylic acid functional groups may be obtained from a carboxylic acid or anhydride thereof having a pKa of less than 5.5, such as dimethylolpropionic acid (DMPA). The carboxylic acid functional groups may be obtained from a carboxylic acid or anhydride thereof having a pKa of less than 3, such as trimellitic anhydride.

The coating composition may be substantially free (less than 5 weight percent based on total resin solids) of unreacted polyisocyanate. The coating composition may be essentially free (less than 1 weight percent based on total solids) of unreacted polyisocyanate. The coating composition may be free (0 weight percent based on total solids) of unreacted polyisocyanate. As used herein, "unreacted isocyanate" refers to a molecule having at least one —N=C=O group at ambient temperature.

The coating composition may be substantially free (less than 5 weight percent based on total resin solids) of polyurethane-acrylate core-shell particles (b1) and/or (b2) containing keto and/or aldo functional groups or other additional latex resins containing keto and/or aldo functional groups. The coating composition may be essentially free (less than 1 weight percent based on total solids) of polyurethane-acrylate core-shell particles (b1) and/or (b2) containing keto and/or aldo functional groups or other additional latex resins containing keto and/or aldo functional groups. The coating composition may be free (0 weight percent based on total solids) of polyurethane-acrylate core-shell particles (b1) and/or (b2) containing keto and/or aldo functional groups or other additional latex resins containing keto and/or aldo functional groups.

The coating composition may include an adhesion promoter. The adhesion promotor may comprise a silane compound. The adhesion promoter may be reactive with the substrate to which the coating composition is applied and the resin of the coating composition so as to enhance adhesion of the cured coating to the substrate.

The coating composition may further comprise a crosslinker reactive with functional groups on: (i) the polyurethane-acrylate core-shell particles (b1) and/or (b2); (ii) the compound (c1); and/or (iii) a reaction product obtained from the polyurethane-acrylate core-shell particles (b1) and the compound (c1). The crosslinker may comprise a blocked isocyanate, a carbodiimide, an aminoplast, or a combination thereof. The aminoplast crosslinker may include melamine. The aminoplast crosslinker may include condensates of amines and/or amides with aldehyde. For example, the condensate of melamine with formaldehyde is an example of a suitable aminoplast. The aminoplast crosslinker may be separate from (c1)(iii) the compound that generates formaldehyde (e.g., the melamine formaldehyde resin). The crosslinker may be separate from (b1) and/or (b2), and (c1).

The coating composition may be a one-component (1K) curing composition. As used herein, a "1K curing composition" refers to a composition wherein all the coating components are maintained in the same container after manufacture, during storage, and the like, and may remain stable for longer than 1 month at ambient conditions, such as longer than 3 months, longer than 6 months, longer than 9 months, or longer than 12 months. A 1K curing composition can be applied to a substrate and cured by any conventional means, such as by heating, forced air, and the like.

The coating composition can also include additional materials such as a pigment. The pigment may include a finely divided solid powder that is insoluble, but wettable, under the conditions of use. A pigment can be organic or inorganic and can be agglomerated or non-agglomerated. Pigments can be incorporated into the coating by use of a grind vehicle, such as an acrylic grind vehicle, the use of which will be familiar to one skilled in the art. The core-shell particles (b1) and/or (b2) may function as the grind vehicle for the pigment.

Suitable pigments and/or pigment compositions include, but are not limited to, carbazole dioxazine crude pigment, azo, monoazo, diazo, naphthol AS, salt type (flakes), benzimidazolone, isoindolinone, isoindoline and polycyclic phthalocyanine, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone pigments, diketo pyrrolo pyrrole red ("DPPBO red"), titanium dioxide, carbon black, or mixtures thereof.

The pigment used with the coating composition can also comprise a special effect pigment. As used herein, a "special effect pigment" refers to a pigment that interacts with visible light to provide an appearance effect other than, or in addition to, a continuous unchanging color. Suitable special effect pigments include those that produce one or more appearance effects such as reflectance, pearlescence, metallic sheen, texture, phosphorescence, fluorescence, photochromism, photosensitivity, thermochromism, goniochromism, and/or color-change, such as transparent coated mica and/or synthetic mica, coated silica, coated alumina, aluminum flakes, a transparent liquid crystal pigment, a liquid crystal coating, or a combination thereof.

In some examples, the coating composition may be a clearcoat substantially free of a pigment. Substantially free of a pigment may mean that the coating composition comprises less than 3 weight % of pigment, based on solids, such as less than 2 weight %, less than 1 weight %, or 0 weight %.

Other suitable materials that can be used with the coating composition include, but are not limited to, plasticizers, abrasion resistant particles, anti-oxidants, hindered amine light stabilizers, UV light absorbers and stabilizers, surfactants, flow and surface control agents, thixotropic agents, catalysts, reaction inhibitors, and other customary auxiliaries.

The coating composition may be curable at a temperature of less than or equal to 100° C., such that, when the coating composition is applied to a substrate to form a layer having a thickness from 5 to 100 microns and baked at 100° C. for 30 minutes, the layer achieves at least 35, such as at least 50, at least 70, at least 90, or at least 100 MEK double rubs as measured according to the Solvent Resistance Test described in the Examples. The coating composition may be curable at a temperature of less than or equal to 80° C., such that, when the coating composition is applied to a substrate to form a layer having a thickness from 5 to 100 microns and baked at 80° C. for 30 minutes, the layer achieves at least 35, such as at least 50, at least 70, at least 90, or at least 100 MEK double rubs as measured according to the Solvent Resistance Test described in the Examples.

The coating composition may be applied to a substrate and cured to form a coating thereover. The coating may be a continuous film formed over at least a portion the substrate.

The substrate over which the coating composition may be applied includes a wide range of substrates. For example, the coating composition of the present invention can be applied to a vehicle substrate, an industrial substrate, an aerospace substrate, and the like.

The vehicle substrate may include a component of a vehicle. In the present disclosure, the term "vehicle" is used in its broadest sense and includes all types of aircraft, spacecraft, watercraft, and ground vehicles. For example, the vehicle can include, but is not limited to an aerospace substrate (a component of an aerospace vehicle, such as an aircraft such as, for example, airplanes (e.g., private airplanes, and small, medium, or large commercial passenger, freight, and military airplanes), helicopters (e.g., private, commercial, and military helicopters), aerospace vehicles (e.g., rockets and other spacecraft), and the like). The vehicle can also include a ground vehicle such as, for example, animal trailers (e.g., horse trailers), all-terrain vehicles (ATVs), cars, trucks, buses, vans, heavy duty equipment, tractors, golf carts, motorcycles, bicycles, snowmobiles, trains, railroad cars, and the like. The vehicle can also include watercraft such as, for example, ships, boats, hovercrafts, and the like. The vehicle substrate may include a component of the body of the vehicle, such as an automotive hood, door, trunk, roof, and the like; such as an aircraft or spacecraft wing, fuselage, and the like; such as a watercraft hull, and the like.

The coating composition may be applied over an industrial substrate which may include tools, heavy duty equipment, furniture such as office furniture (e.g., office chairs, desks, filing cabinets, and the like), appliances such as refrigerators, ovens and ranges, dishwashers, microwaves, washing machines, dryers, small appliances (e.g., coffee makers, slow cookers, pressure cookers, blenders, etc.), metallic hardware, extruded metal such as extruded aluminum used in window framing, other indoor and outdoor metallic building materials, and the like.

The coating composition may be applied over storage tanks, windmills, nuclear plant components, packaging substrates, wood flooring and furniture, apparel, electronics, including housings and circuit boards, glass and transparencies, sports equipment, including golf balls, stadiums, buildings, bridges, and the like.

The substrate can be metallic or non-metallic. Metallic substrates include, but are not limited to, tin, steel (including electrogalvanized steel, cold rolled steel, hot-dipped galvanized steel, among others), aluminum, aluminum alloys, zinc-aluminum alloys, steel coated with a zinc-aluminum alloy, and aluminum plated steel. Non-metallic substrates include polymeric materials, plastic and/or composite material, polyester, polyolefin, polyamide, cellulosic, polystyrene, polyacrylic, poly(ethylene naphthalate), polypropylene, polyethylene, nylon, ethylene vinyl alcohol (EVOH), polylactic acid, other "green" polymeric substrates, poly (ethyleneterephthalate) (PET), polycarbonate, polycarbonate acrylobutadiene styrene (PC/ABS), wood, veneer, wood composite, particle board, medium density fiberboard, cement, stone, glass, paper, cardboard, textiles, leather, both synthetic and natural, and the like. The substrate may comprise a metal, a plastic and/or composite material, and/or a fibrous material. The fibrous material may comprise a nylon and/or a thermoplastic polyolefin material with continuous strands or chopped carbon fiber. The substrate can be one that has already been treated in some manner, such as to impart visual and/or color effect, a protective pretreatment or other coating layer, and the like.

The coating composition of the present invention may be particularly beneficial when applied to a metallic substrate. The coatings of the present invention maybe particularly beneficial when applied to metallic substrates that are used to fabricate automotive vehicles, such as cars, trucks, and tractors.

The coating composition may be applied to a substrate having multiple components, wherein the coating composition is simultaneously applied to the multiple components and simultaneously cured to form a coating over the multiple components without deforming, distorting, or otherwise degrading any of the components. The components may be parts of a larger whole of the substrate. The components may be separately formed and subsequently arranged together to form the substrate. The components may be integrally formed to form the substrate.

Non-limiting examples of components of a substrate in the vehicle context include a vehicle body (e.g., made of metal) and a vehicle bumper (e.g., made or plastic) which are separately formed and subsequently arranged to form the substrate of the vehicle. Further examples include a plastic automotive component, such as a bumper or fascia in which the bumper or fascia comprises regions or subcomponents which comprise more than one type of substrate. Further examples include aerospace or industrial components comprising more than one substrate type. It will be appreciated that other such other multi-component substrates are contemplated within the context of this disclosure.

The multiple components may include at least a first component and a second component, and the first component and the second component may be formed from different materials. As used herein, "different materials" refers to the materials used to form the first and second component having different chemical make-ups.

The different materials may be from the same or different class of materials. As used herein, a "class of materials" refers to materials that may have a different specific chemical make-up but share the same or similar physical or chemical properties. For example, metals, polymers, ceramics, and composites may be defined as different classes of materials. However, other classes of materials may be defined depending on similarities in physical or chemical properties, such as nanomaterials, biomaterials, semiconductors, and the like. Classes of materials may include crystalline, semi-crystalline, and amorphous materials. Classes of materials, such as for polymers, may include thermosets, thermoplastics, elastomers, and the like. Classes of materials, such as for metals, may include alloys and non-alloys. As will be appreciated from the above exemplary list of classes, other relevant classes of materials may be defined based on a given physical or chemical property of materials.

The first component may be formed from a metal, and the second component may be formed from a plastic or a composite. The first component may be formed from a plastic, and the second component may be formed from a metal or a composite. The first component may be formed from a composite, and the second component may be formed from a plastic or a metal. The first component may be formed from a first metal, and the second component may be formed from a second metal different from the first metal. The first component may be formed from a first plastic, and the second component may be formed from a second plastic different from the first plastic. The first component may be formed from a first composite, and the second component may be formed from a second composite different from the first composite. As will be appreciated from these non-limiting examples, any combination of different materials from the same or different classes may form the first and second components.

Examples of combinations of materials include thermoplastic polyolefins (TPO) and metal, TPO and acrylonitrile butadiene styrene (ABS), TPO and acrylonitrile butadiene styrene/polycarbonate blend (ABS/PC), polypropylene and TPO, TPO and a fiber reinforced composite, and other combinations. Further examples include aerospace substrates or industrial substrates comprising various components made of a plurality of materials, such as various metal-plastic, metal-composite, and/or plastic-composite containing components. The metals may include ferrous metals and/or non-ferrous metals. Non-limiting examples of non-ferrous metals include aluminum, copper, magnesium, zinc, and the like, and alloys including at least one of these metals. Non-limiting examples of ferrous metals include iron, steel, and alloys thereof.

The first component and the second component (the materials thereof) may exhibit different physical or chemical properties when exposed to elevated temperatures. For example, the first component may deform, distort, or otherwise degrade at a temperature lower than the second component. Non-limiting examples of material properties which may indicate whether a first component deforms, distorts, or otherwise degrades at a temperature lower than the second component include: heat deflection temperature, embrittlement temperature, softening point, and other relevant material properties associated with deformation, distortion, or degradation of materials.

For example, the first component may deform, distort, or otherwise degrade at temperatures ranging from above 80° C. to 120° C., whereas the second component may not deform, distort, or otherwise degrade at temperatures within or below this range. The first component may deform, distort, or otherwise degrade at temperatures below 120° C., such as below 110° C., below 100° C., or below 90° C., whereas the second component may not deform, distort, or otherwise degrade at temperatures within these ranges.

When the coating composition is applied to the substrate having multiple components simultaneously, the applied coating composition may be cured at a temperature which does not deform, distort, or otherwise degrade either of the first and second component (the materials thereof). Thus, the curing temperature may be below the temperature at which either of the first component or the second component would deform, distort, or otherwise degrade. The coating composition may be cured at temperatures ranging from 80° C. to 120° C. where neither the first component nor the second component would deform, distort, or otherwise degrade within that range. The coating composition may be cured at temperatures less than or equal to 120° C., less than or equal to 110° C., less than or equal to 100° C., less than or equal to 90° C., or less than or equal to 80° C. where neither the first component nor the second component would deform, distort, or otherwise degrade within these ranges.

Therefore, the coating composition may be curable at relatively low temperatures, within the ranges mentioned above, such that components formed from different materials may be simultaneously coated with the coating composition and cured to form a coating thereover without deforming, distorting, or otherwise degrading either component.

The coating composition may be applied to the substrate by any suitable means, such as spraying, electrostatic spraying, dipping, rolling, brushing, and the like.

The coating composition can be applied to a substrate to form a monocoat. As used herein, a "monocoat" refers to a single layer coating system that is free of additional coating layers. Thus, the coating composition can be applied directly to a substrate and cured to form a single layer coating, i.e. a monocoat. When the coating composition is applied to a substrate to form a monocoat, the coating composition can include additional components to provide other desirable properties. The coating composition may be applied as a direct to metal substrate monocoat.

The coating composition can be applied to a substrate as a coating layer of a multi-layer coating system, such that one or more additional coating layers are formed below and/or above the coating formed from the coating composition.

The coating composition can be applied to a substrate as a primer coating layer of the multi-layer coating system. A "primer coating layer" refers to an undercoating that may be deposited onto a substrate (e.g., directly or over a pretreatment) in order to prepare the surface for application of a protective or decorative coating system.

The coating composition can be applied to a substrate as a basecoat layer of the multi-layer coating system. A "basecoat" refers to a coating that is deposited onto a primer overlying a substrate and/or directly onto a substrate, optionally including components (such as pigments) that impact the color and/or provide other visual impact.

The coating composition can be applied to a substrate as a topcoat layer of the multi-layer coating system. A "topcoat" refers to an uppermost coating that is deposited over another coating layer such as a basecoat to provide a protective and/or decorative layer.

The topcoat layer used with the multi-layer coating system of the present invention may be a clearcoat layer. As used herein, a "clearcoat" refers to a coating layer that is at least substantially transparent or fully transparent. The term "substantially transparent" refers to a coating, wherein a surface beyond the coating is at least partially visible to the naked eye when viewed through the coating. The term "fully transparent" refers to a coating, wherein a surface beyond the coating is completely visible to the naked eye when viewed through the coating. It is appreciated that the clearcoat can comprise colorants, such as pigments, provided that the colorants do not interfere with the desired transparency of the clearcoat. The clearcoat can be substantially free or free of pigments.

The coating composition may be applied over a substrate as a layer in a multi-layer coating system. In the multi-layer coating system, a first basecoat layer may be applied over at least a portion of a substrate, wherein the first basecoat layer is formed from a first basecoat composition. A second basecoat layer may be applied over at least a portion of the first basecoat layer, wherein the second basecoat layer is formed from a second basecoat composition. The second basecoat layer may be applied after the first basecoat composition has been cured to form the first basecoat layer or may be applied in a wet-on-wet process prior to curing the first basecoat composition, after which the first and second basecoat compositions are simultaneously cured to form the first and second basecoat layers.

At least one of the first and second basecoat compositions may be the coating composition of the present invention. The first and second basecoat compositions may be the same composition with both the first and second basecoat compositions comprising the coating composition of the present invention. The first and second basecoat compositions may be different with only one of the first and second basecoat compositions comprising the coating composition of the present invention.

The multi-layer coating system may include a primer coating layer formed from a primer composition applied over the substrate. The first basecoat layer may be positioned over at least a portion of the primer coating layer The multi-layer coating system may include a topcoat layer formed from a topcoat composition applied over the substrate. The topcoat composition may be applied over at least a portion of the second basecoat layer. The topcoat may be a clearcoat.

A substrate having a multi-layer coating system applied thereover may be prepared by applying a first basecoat composition onto at least a portion of the substrate and applying a second basecoat composition directly onto at least a portion of the first basecoat composition. The first and second basecoat compositions may be cured simultaneously to form first and second basecoat layers. The first and second basecoat compositions may be cured at a temperature of 100° C. or less, such as 80° C. or less, to form the first and second basecoat layers. At least one of the first and second basecoat compositions may comprise the coating composition of the present invention.

Preparing the multi-layer coating system may include forming a primer coating layer over at least a portion of the substrate and applying the first basecoat composition onto at least a portion of the primer coating layer.

Preparing the multi-layer coating system may include applying a topcoat composition onto at least a portion of the second basecoat composition. The topcoat composition may be applied onto the second basecoat composition prior to or after curing the first and second basecoat compositions. The first basecoat composition, the second basecoat composition, and the topcoat composition may be simultaneously cured at a temperature of 100° C. or less, such as 80° C. or less.

The present invention is also directed to a process for preparing a film-forming thermoset coating composition, comprising: (A) mixing (c1) (i) formaldehyde; (ii) polyformaldehyde; and/or (iii) a compound that generates formaldehyde with a composition comprising (b1) polyurethane-acrylate core-shell particles comprising a polymeric acrylic core at least partially encapsulated by a polymeric shell comprising urethane linkages, wherein the polymeric shell comprises an acid functional group and two or more hydrazide functional groups, wherein the polymeric shell is covalently bonded to at least a portion of the polymeric core, (B) aging the mixture provided in step (A) for a time period to form the N-methylolated hydrazide functional groups in the polyurethane-acrylate core-shell particles, and (C) including the mixture obtained in step (B) into a composition in order to prepare a film-forming thermoset coating composition comprising an aqueous medium.

The mixture may be aged in step (B) for at least 1 hour, such as at least 4 hours, such as from 4 to 48 hours, such as from 10 to 24 hours, such as from 1 to 24 hours. The mixture may be aged in step (B) at a temperature of from 20° C. to 70° C., such as from 20° C. to 65° C. or from 20° C. to 60° C. The mixture may be aged in a reaction vessel according to the above-described time and temperature conditions, and the aged mixture may be incorporated into a coating formulation comprising other optional materials to form a coating composition.

In the mixture, (c1) (i) formaldehyde; (ii) polyformaldehyde; and/or (iii) a compound that generates formaldehyde may be present in a stoichiometric excess of hydrazide groups. In the mixture, hydrazide groups may be present in a stoichiometric excess of (c1) (i) formaldehyde; (ii) polyformaldehyde; and/or (iii) a compound that generates formaldehyde, such that not all hydrazide groups are reacted therewith. The stoichiometric ratio of formaldehyde to hydrazide may be 1:1 or range from 2:1 to 1:2, such as from 1.5:1 to 1:1.5.

The present invention is also directed to a process for preparing a film-forming thermoset coating composition, comprising: (A) mixing (c1) (i) formaldehyde; (ii) polyformaldehyde; and/or (iii) a compound that generates formaldehyde with a composition comprising (b1) polyurethane-acrylate core-shell particles comprising a polymeric acrylic core at least partially encapsulated by a polymeric shell comprising urethane linkages, wherein the polymeric shell comprises an acid functional group and two or more hydrazide functional groups, wherein the polymeric shell is covalently bonded to at least a portion of the polymeric core, in order to prepare a film-forming thermoset coating composition comprising an aqueous medium, and (B) aging the mixture provided in step (A) for a time period to form the N-methylolated hydrazide functional groups in the polyurethane-acrylate core-shell particles. The mixture may also comprise other optional materials to form a coating composition. The mixture may include all components intended to be incorporated into the coating composition, such that the whole composition is aged as described below.

The mixture may be aged in step (B) for at least 24 hours, such as at least 48 hours, such as up to 6 months, such as from 24 hours to 6 months, such as from 48 hours to 6 months. The mixture may be aged in step (B) at a temperature of from 20° C. to 70° C., such as from 20° C. to 65° C. or from 20° C. to 60° C. The mixture (e.g., the whole composition) may be aged in a packaging container, such as a packaging container used to sell the coating composition at a retail location.

In the mixture, (c1) (i) formaldehyde; (ii) polyformaldehyde; and/or (iii) a compound that generates formaldehyde may be present in a stoichiometric excess of hydrazide groups. In the mixture, hydrazide groups may be present in a stoichiometric excess of (c1) (i) formaldehyde; (ii) polyformaldehyde; and/or (iii) a compound that generates formaldehyde, such that not all hydrazide groups are reacted therewith. The stoichiometric ratio of formaldehyde to hydrazide may be 1:1 or range from 2:1 to 1:2, such as from 1.5:1 to 1:1.5.

EXAMPLES

The following examples are presented to demonstrate the general principles of the invention. The invention should not be considered as limited to the specific examples presented.

Example 1

Preparation of a Polyester Prepolymer

A polyester prepolymer according to the present invention was prepared from the components listed in Table 1 in a four-neck round bottom flask equipped with an electronic temperature probe, mechanical stirrer, condenser, dry nitrogen sparge, and a heating mantle.

TABLE 1

| Component | Amount (grams) |
|---|---|
| POLYTHF 650[1] | 4316.7 |
| Trimellitic anhydride | 1701.3 |
| Diethylene glycol | 1174.6 |
| Butylstannoic acid | 3.02 |
| Triphenylphosphite | 3.60 |

[1] A poly(tetrahydrofuran) available from BASF (Ludwigshafen, Germany)

The components were charged to the flask and the temperature was gradually increased to 170° C. over a two hour period while stirring, sparging with nitrogen, and collecting the distillate. The reaction temperature was held at 170° C. for 2.5 hours until the acid value dropped to 54 and 170 ml of distillate was collected. The final product was a light yellow liquid with a Gardner-Holdt viscosity of Z7+ (as measured herein according to ASTM D1545-89), a hydroxyl value of 129, a Mn of 1914 g/mol, a Mw of 6307 g/mol, and a nonvolatile content of 95.0%. Acid values and hydroxyl values were determined using a Metrohm 798 MPT Titrino automatic titrator according to ASTM D 4662-15 and ASTM E 1899-16. Non-volatile contents (also referred to herein a solids content) were measured by comparing initial sample weights to sample weights after exposure to 110° C. for 1 hour.

Comparative Example 2

Preparation of a Polyester-Polyurethane Dispersion

A polyester-polyurethane dispersion was prepared from the components listed in Table 2 in a four-neck round bottom flask equipped with an electronic temperature probe, mechanical stirrer, condenser, and a heating mantle.

TABLE 2

| Component | Amount (grams) |
|---|---|
| Charge A | |
| Polyester prepolymer of Example 1 | 1339.7 |
| Polytetrahydrofuran, molecular weight 1000 | 584.9 |
| Hydroxyethyl methacrylate (HEMA) | 76.1 |
| Triphenylphosphite | 2.0 |
| Dibutyltin dilaurate | 1.0 |
| Butylated hydroxytoluene (Ionol) | 2.0 |
| Charge B | |
| Butyl acrylate | 461.0 |
| Charge C | |
| Tetramethylxylylene diisocyanate (TMXDI) | 342.8 |
| Charge D | |
| Butyl acrylate | 45.6 |
| Charge E | |
| Water | 3038.3 |
| Dimethylethanolamine | 55.5 |
| Charge F | |
| Water | 1127.1 |
| 3-mercaptopropionic acid | 9.6 |
| PAM 200[2] | 96.2 |
| Dimethylethanolamine (DMEA) | 26.3 |
| FOAMKILL 649[3] | 1.0 |
| Charge G | |
| Butyl acrylate (BA) | 416.7 |
| Ethylene glycol dimethacrylate (EGDMA) | 288.5 |
| Charge H | |
| Water | 168.3 |
| t-Butyl hydroperoxide (70%) | 2.2 |
| Charge I | |
| Water | 407.1 |
| Ferrous ammonium sulfate | 0.064 |
| Sodium metabisulfite | 3.2 |
| Dimethylethanolamine | 1.5 |
| Charge J | |
| Water | 6.7 |
| PROXEL ® GXL[4] | 6.7 |

[2] Phosphate esters of acrylic polypropylene glycol) monomethacrylate available from Solvay S.A. (Brussels, Belgium)
[3] A defoamer available Crucible Chemical Company (Greenville, SC)
[4] A preservative available from Arch Chemicals, Inc. (Norwalk, CT)

Charge A was heated in the flask to 90° C. Charge B was added and the mixture was reheated to 90° C. Charge C was added over 60 minutes. Charge D was used to rinse the addition funnel used for Charge C. The reaction mixture was held at 90° C. for 2 hours. Charge E was heated in a separate 12 liter four-neck flask under a nitrogen atmosphere to 80° C. The 2406 g of the reaction product of charges A, B, C, and D was added to charge E over an 8 minute period. The reaction product had a number average molecular weight (Mn) of 3658 g/mol and a weight average molecular weight (Mw) of 20658 g/mol. A nitrogen atmosphere was established and maintained in the flask for the remainder of the reaction. Charges F and G were added to the reaction flask and the reaction mixture was adjusted to 28° C. Charge H was added followed by a thirty minute addition of charge I. The temperature rose exothermically to 60° C. Charge J was added. The final dispersion had a Brookfield viscosity (measured according to ASTM D2196 at ambient temperature (20° C.-27° C.)) of 174 centipoise (spindle #2, 60 RPM), an acid value of 10.7, a pH of 7.7 (measured herein according to ASTM D4584), and a nonvolatile content of 39.8%.

Example 3

Preparation of an Acid-Hydrazide-Functional Resin

A polyurethane was prepared by charging the following components in order into a kettle reactor fitted with baffles, thermocouple, mechanical stirrer, and condenser: 523.1 g of polytetrahydrofuran molecular weight 1000, 108.7 g of dimethylolpropionic acid, 7.1 g of hydroxyethyl methacrylate, 26.2 g of triethylamine, and 1.09 g of Ionol. The mixture was heated to 90° C. and held for 30 minutes. Next, 46.6 g EGDMA and 382.4 g of butyl acrylate was charged and temperature was lowered to 50° C. Next, 374.0 g of isophorone diisocyanate was charged into the reactor over 20 minutes. The isocyanate-adding funnel was rinsed with 37.4 g of butyl acrylate. The temperature of the reaction mixture was held at 90° C. for 2 hours; then the reaction temperature was lowered to 65° C. 90% of the reaction mixture above was charged into a water solution of 1820.6 g of deionized water, 66.9 g of adipic dihydrazide, and 21.4 g of dimethylethanolamine (DMEA), and then mixed and held for 15 minutes to make a polymer dispersion.

A second Kettle reactor fitted with baffles, thermocouple, mechanical stirrer, and condenser was charged with 2216.0 g of deionized water, 6.17 g of dimethylethanolamine, 0.72 g of FOAMKILLL 649, 7.35 g of mercaptopropionic acid (MPA), and 3265.1 g of the polymer dispersion made above, and then a mixture of 871.1 g of butyl acrylate and 178.5 g of EGDMA was charged to the reactor, and then the mixtures were mixed for 10 minutes and then heated to 28° C. A mixture of 128.6 g of deionized water and 1.71 g of t-butylhydroperoxide was added to the reactor. Then a mixture of 310 g of deionized water, 0.049 g of ferrous ammonium sulfate, 2.449 g of sodium metabisulfite, and 1.148 g of dimethylethanolamine was charged into the reactor over 30 minutes, after exothermal, the reaction mixture was cooled to 30° C., then a mixture of 5.09 g of PROXEL GXL, 5.09 g of deionized water was charged to the reactor. The final dispersion had a Brookfield viscosity of 241 centipoise (spindle #2, 50 RPM), a pH of 8.1, and a nonvolatile content of 35.

Example 4

Preparation of an Acid-Hydrazide-Functional Resin

A polyurethane was prepared by charging the following components in order into a kettle reactor fitted with baffles, thermocouple, mechanical stirrer, and condenser: 979.1 g of polytetrahydrofuran molecular weight 1000, 173.2 g of dimethylolpropionic acid, 28.2 g of hydroxyethyl methacrylate, 41.8 g of triethylamine, and 2.16 g of Ionol. The mixture was heated to 90° C. and held for 30 minutes. Next, 54.2 g EGDMA and 411.0 g of butyl acrylate was charged and temperature was adjusted to 50° C. Next, 764.9 g of isophorone diisocyanate was charged into the reactor over 20 minutes. The isocyanate-adding funnel was rinsed with 76.5 g of butyl acrylate. The temperature of the reaction mixture was held at 90° C. for 2 hours, then the reaction temperature was lowered to 65° C. 90% of the reaction mixture above was charged into a water solution of 3990.7 g of deionized water, 197.3 g of adipic dihydrazide and 34.2 g of DMEA, and then mixed and held for 15 minutes to make a polymer dispersion.

A second Kettle reactor fitted with baffles, thermocouple, mechanical stirrer, and condenser was charged with 6.14 g of dimethylethanolamine, 0.72 g of FOAMKILL 649, 7.31 g of MPA, and 6500 g of the polymer dispersion made above, and then the mixtures were mixed for 10 minutes and then heated to 28° C. A mixture of 128.0 g of deionized water and 1.71 g of t-butylhydroperoxide was added to the reactor. Then a mixture of 310 g of deionized water, 0.049 g of ferrous ammonium sulfate, 2.438 g of sodium metabisulfite and 1.142 g of dimethylethanolamine was charged into the reactor charged to the reactor over 30 minutes, after exothermal, the reaction mixture was cooled to 30° C., then a mixture of 5.07 g of PROXEL GXL and 5.07 g of deionized water was charged to the reactor. The final dispersion had a Brookfield viscosity of 596 centipoise (spindle #2, 50 RPM), a pH of 8.06, and a nonvolatile content of 35%.

Comparative Example 5

Preparation of a Grey Basecoat 1 Composition

A grey basecoat 1 was prepared from the following mixture of ingredients:

TABLE 3

| Components | Parts by weight of Component |
|---|---|
| Polyurethane-acrylic dispersion from Example 2 | 282.9 |
| BYK 348[5] | 0.50 |
| BYK 032[6] | 3.10 |
| SURFYNOL 104E[7] | 6.70 |
| 50% DMEA[8] | 1.59 |
| Mineral Spirits[9] | 5.0 |
| White Tint[10] | 55.0 |
| Black Tint[11] | 23.8 |
| Yellow Tint[12] | 8.1 |
| n-butanol[13] | 11.7 |
| DOWANOL PnB[14] | 5.0 |
| RESIMENE HM2608[15] | 40.2 |
| BYKETOL WS[16] | 12.9 |
| ACRYSOL ASE-60[17] | 5.7 |
| Deionized Water | 130.2 |
| Total | 592.39 |

[5]Surfactant available from BYK Chemie (Wesel, Germany)

[6]Defoamer available from BYK Chemie (Wesel, Germany)

[7]Surfactant available from Evonik Industries (Essen, Germany)

[8]Dimethyl ethanolamine 50% aqueous solution

[9]Odorless mineral spirits available from Exxon Mobil Corporation (Irving, TX)

[10]White tint paste consisting of 68% TiO2 dispersed in 9% polyester polymer blend having a solids content of 78%. The polyester polymer is a copolymer of poly(tetrahydrofuran) with a number-average molecular weight of 650 g/mol and trimellitic anhydride, with a solids content of 36.5% by weight, acid value of 30 and number-average molecular weight of 3600 g/mol

[11]Black Tint paste consisting of 14% carbon black dispersed in 26% polyester polymer and having a solids content of 41%. The polyester polymer is as described in Footnote 10

[12]Yellow Tint paste consisting of 47% MAPICO Yellow 1050AG dispersed in 16% polyester polymer and having a solids content of 63%. The polyester polymer is as described in Footnote 10

[13]Solvent available from BASF (Ludwigshafen, Germany)

[14]Solvent available from Shell Chemical Company (Houston, TX)

[15]Melamine-formaldehyde (MF) resin available from Prefere Resins (Erkner, Germany). RESIMENE HM 2608 is a compound that generates formaldehyde and contains free hydroxyl groups as is evident from the $^{13}$C-NMR spectra obtained thereof in FIG. 1a of WO 2019/241234.

[16]Surface additive available from BYK Chemie (Wesel, Germany)

[17]Aqueous acrylic emulsion thickener, available from Dow Chemical Company (Midland, MI)

Example 6

Preparation of a Grey Basecoat 1 Composition

A grey basecoat 1 was prepared from the following mixture of ingredients:

TABLE 4

| Components | Parts by weight of Component |
|---|---|
| Polyurethane-acrylic dispersion from Example 3 | 289.7 |
| Polyurethane-acrylic dispersion from Example 4 | 20.7 |
| BYK 348[5] | 0.50 |
| BYK 032[6] | 3.10 |
| SURFYNOL 104E[7] | 6.70 |
| 50% DMEA[8] | 1.59 |
| Mineral Spirits[9] | 5.0 |
| White Tint[10] | 55.0 |
| Black Tint[11] | 23.8 |
| Yellow Tint[12] | 8.1 |
| n-butanol[13] | 11.7 |
| DOWANOL PnB[14] | 5.0 |
| RESIMENE HM2608[15] | 40.2 |
| BYKETOL WS[16] | 12.9 |
| ACRYSOL ASE-60[17] | 5.7 |
| Deionized Water | 130.2 |
| Total | 619.89 |

Comparative Example 7

Preparation of a Black Basecoat 2 Composition

TABLE 5

| Components | Parts by weight of Component |
|---|---|
| Polyurethane-acrylic dispersion from Example 2 | 274.88 |
| BYK 348[5] | 0.38 |
| BYK 032[6] | 3.22 |
| SURFYNOL 104E[7] | 8.27 |
| 50% DMEA[8] | 1.59 |
| Mineral Spirits[9] | 9.84 |
| Black Tint[18] | 127.42 |
| 2-ethyhexanol | 8.2 |
| 2-butoxyethanol | 8.46 |
| DOWANOL PnB[14] | 4.94 |
| RESIMENE HM2608[15] | 36.45 |
| BYKETOL WS[16] | 16.40 |
| ACRYSOL ASE-60[17] | 5.7 |
| Deionized Water | 118.7 |
| Total | 624.45 |

[18] A black tint paste consisting of 6.3% MONARCH 1300 (available from Cabot Corporation (Boston, MA)) carbon black dispersed in 18% acrylic polymer and having a solids content of 25.5%. The acrylic polymer is a copolymer of 17.9% (by weight) of butyl methacrylate, 29.99% (by weight) of styrene, 34.98% (by weight) of butyl acrylate, 8.52% (by weight) of acrylic acid, and 8.52% (by weight) of hydroxyethyl acrylate, with a weight average molecular weight of around 100,000 g/mol and solids content of 27% by weight

Example 8

Preparation of a Black Basecoat 2 Composition

A black basecoat 2 was prepared from the following mixture of ingredients:

TABLE 6

| Components | Parts by weight of Component |
|---|---|
| Polyurethane-acrylic dispersion from Example 3 | 281.56 |
| Polyurethane-acrylic dispersion from Example 4 | 20.05 |
| BYK 348[5] | 0.38 |
| BYK 032[6] | 3.22 |
| SURFYNOL 104E[7] | 8.27 |
| 50% DMEA[8] | 1.59 |
| Mineral Spirits[9] | 9.84 |
| Black Tint[18] | 127.42 |
| 2-ethyhexanol | 8.2 |
| 2-butoxyethanol | 8.46 |
| DOWANOL PnB[14] | 4.94 |
| RESIMENE HM2608[15] | 36.45 |
| BYKETOL WS[16] | 16.40 |
| ACRYSOL ASE-60[17] | 5.7 |
| Deionized Water | 118.7 |
| Total | 532.48 |

Example 9

Preparation of a Clearcoat Composition

A two component polyol-polyisocyanate crosslinkable clearcoat composition based on 2K CERAMICLEAR repair clearcoat BMW A-B204134 (available from PPG Industries, Inc. (Pittsburgh, Pa.)) was used with the following exceptions. Same Component A containing polyol was used in this study, and Component B containing free polyisocyanate was modified as listed in Table 7. The mix ratio of Component A in 2K CERAMICLEAR and Component B was 2:1 by weight, and the molar equivalent ratio of isocyanate and hydroxyl groups is 1.25.

TABLE 7

| DESMODUR N-3300A[19] (grams) | DESMODUR Z-4470[20] BA (grams) | n-amyl acetate[21] (grams) | n-butyl acetate[22] (grams) | Aromatic 100[23] (grams) | 10% dibutyl tin dilaurate[24] in Xylene[25] (grams) |
|---|---|---|---|---|---|
| 27.64 | 16.92 | 8 | 6 | 4 | 0.5 |

[19] A free polyisocyanate available from Covestro (Leverkusen, Germany)
[20] A free polyisocyanate available from Covestro (Leverkusen, Germany)
[21] A solvent available from Dow Chemical Company (Midland, MI)
[22] A solvent available from Dow Chemical Company (Midland, MI)
[23] A solvent is available from Shell Chemical Company (Houston, TX)
[24] Dibutyl tin dilaurate available from Air Products and Chemicals (Allentown, PA)
[25] Xylene solvent available from Ashland Inc. (Wilmington, DE)

Examples 10 and 11

Preparation and Evaluation of Multi-Layer Coatings

Various multi-layer coatings having two separate basecoats and one clearcoat were prepared with the components, as listed in Table 8.

TABLE 8

| Multi-layer Coating | Composition used to form First Basecoat Layer | Composition used to form Second Basecoat Layer | Clearcoat Layer |
|---|---|---|---|
| Comparative Example 10 | Comparative Example 5 | Comparative Example 7 | Example 9 |
| Example 11 | Example 6 | Example 8 | Example 9 |

Each multi-layer coating was prepared by spraying their respective first and second basecoat compositions over 4 inch by 12 inch steel panels that were pre-coated with an ED 6465 electrocoat (an electrocoat available from PPG Industries, Inc. (Pittsburgh, Pa.)) which had been processed and baked according to the manufacturer's recommendations. The basecoat compositions were applied under controlled environmental conditions of 70° F.-75° F. (21° C.-24° C.) and 60-65% relative humidity. First, the first basecoat compositions were applied in one coat, then flashed under controlled environmental conditions of 70° F.-75° F. (21° C.-24° C.) for five minutes. The dry film thickness of the first basecoats were from 18-20 microns. Next, the second basecoat composition of each multi-layer coating was applied in two coats, with a 90 second ambient flash between coats, and then flashed at ambient temperature for 4 minutes and then dehydrated for 7 minutes at 70° C. The film thickness of the second basecoats were from 14-16 microns.

After forming the basecoat layers, the clearcoat composition was made by mixing Component A and Component B, and then applied over the basecoated panels in two coats with a 90 second ambient flash between coats. The mixing ratio of Component A to Component A was 2:1 by weight. The coated panels were allowed to flash for 10 minutes at ambient conditions and baked for 30 minutes at 80° C. The dry film thickness of the clearcoats were from 50-55 microns. The basecoats and clearcoat were sprayed using Binks Model 95 spray gun with an automatization air pressure at 60 psi.

The distinctness of image (DOI) of the final films were measured by BYK Wave-scan Dual (manufactured by BYK Gardner USA (Columbia, Md.)), and the results are shown in Table 9. The humidity resistance of the final baked films was checked by putting the final baked panels in a 63° C. water bath for 2 days. DOI was measured before the humidity test and after being taken out of the water bath and recovered at room temperature for 1 hour. DOI loss % is defined as (DOI at 1 hour recovery−DOI before humidity)/DOI before humidity. The lower value of DOI loss %, the better humidity resistance of the multi-layer coating.

TABLE 9

| Multi-Layer Coating Example No. | DOI loss % at 1 hour after recovering from humidity test |
|---|---|
| Comparative Example 10 | 50 |
| Example 11 | 1 |

In Table 9, hydrazide functional resins (Example 11) perform significantly better than hydroxyl functional latex (Comparative Example 10) in terms of humidity resistance.

Examples 12A-12O

Preparation and Evaluation of Coatings

Different polymer structures comprised within varying coating compositions were measured for performance using the methods described below.

Each of the Comparative Core-Shell Polymer Example 2, Hydrazide functional Core-Shell Polymer Example 3, and Hydrazide functional Core-Shell Polymer Example 4 were formulated into coating compositions using the following scenarios:

Core-Shell Polymer alone (Examples 12A, 12F, 12K)
Core-Shell Polymer+Formaldehyde, mixed and applied to test panel same day (Examples 12B, 12G, 12L)
Core-Shell Polymer+Formaldehyde, mixed and aged 24 hours at 40° C. prior to application (Examples 12C, 12H, 12M)
Core-Shell Polymer+melamine-formaldehyde compound that generates formaldehyde, mixed and applied to test panel same day (Examples 12D, 12I, 12N)
Core-Shell Polymer+melamine-formaldehyde compound that generates formaldehyde+Polyester Polyol of Example 1, mixed and applied to test panel same day (Examples 12E, 12J, 12O)

The coating compositions were prepared according to the amounts shown in Table 11 using the following method. Each coating composition was mixed in a 20 ml glass scintillation vial using a wooden stirring stick by hand until thoroughly blended. Once each composition was fully blended, it was allowed to sit under ambient conditions for 2 to 3 hours prior to application. For coating compositions in which the core-shell polymer was heat aged with formaldehyde, the heat aging was performed at 60° C. for 24 hours and then the composition was allowed to reach ambient temperature prior to the addition and blending of any further materials to the composition. Each composition was applied onto a test panel using a draw down bar. Each test panel was a 4"×12" steel substrate which was pre-coated with an ED7400 electrocoat primer (available from PPG Industries, Inc. (Pittsburgh, Pa.)) which had been processed and baked according to the manufacturer's recommendations. The test panels containing the wet drawn-down coating compositions sat at ambient conditions for up to 5 minutes prior to being baked at 80° C. in an oven for 30 minutes. The dry film thickness of the cured coating compositions was from 15-18 microns. Each coated test panel was allowed to sit at ambient conditions for 20 to 60 minutes prior to conducting the Solvent Resistance Test.

The Solvent Resistance Test was performed on each cured coating composition using the following procedure:

1. Place the test panel on a flat table or other suitable flat firm surface.
2. Arrange a Wypall Brand paper towel (03086/L30, Available from Kimberly-Clark (Irving, Tex.)) by folding it accordion style and affixing over the ball end of a one-pound Ball-Peen hammer. The paper towel should be snugly held in place with a rubber band in such a fashion so as to have 4 layers of paper towel over the end of the hammer with no wrinkles.
3. Saturate the cloth with the appropriate solvent (methyl ethyl ketone (MEK) was used for these tests) for the material being tested, gauze should be re-saturated every 25 double rubs.
4. Immediately rub the saturated gauze over the test area using a back and forth stroke of ~4-6 inches.
5. Do not exert any downward or upward pressure on the hammer handle. The weight of the hammer controls the downward pressure.
6. Continue this back and forth action counting one "double rub" for each forward and backward motion completed until bare substrate is exposed in the center of the strip where the rubs are performed.
7. Record the test result as the number of double rubs required to expose bare substrate in the center of the rub strip.
8. After the testing of each individual sample, the Wypall was removed and replaced with a new Wypall.

In certain instances, coated and cured test panels were subjected to a 24 hour watersoak at room temperature with deionized water, removed from the watersoak, allowed to recover for 5 minutes, and then tested for cross-hatch adhesion according to the ASTM D3359 test method B. Adhesion results are accessed on a 0 to 5 scale [0-greater than 65% area removed & 5 is 0% area removed].

The coating compositions and results of the testing are shown in Table 11. All material amounts are in grams unless otherwise specified in the table.

TABLE 11

| Coating Example | Core-Shell Polymer Example | | | Formaldehyde (37% solution in water) | RESIMENE HM 2608[15] | Polyester Polyol of Example 1 | Solvent Resistance (MEK Double Rubs) | Adhesion After Watersoak |
|---|---|---|---|---|---|---|---|---|
| | Comparative Example 2 (Hydroxyl) | Example 3 (Hydrazide) | Example 4 (Hydrazide) | | | | | |
| 12A | 19.8 | — | — | — | — | — | 3 | N/A |
| 12B | 19.8 | — | — | 0.2 | — | — | 4 | N/A |
| 12C* | 19.8 | — | — | 0.2 | — | — | 4 | N/A |
| 12D | 18.0 | — | — | — | 2.0 | — | 150 | N/A |
| 12E | 13.26 | — | — | — | 1.96 | 4.78 | 150 | N/A |
| 12F | — | 19.8 | — | — | — | — | 6 | N/A |
| 12G | — | 19.8 | — | 0.2 | — | — | 39 | N/A |
| 12H* | — | 19.5 | — | 0.2 | — | — | 150 | N/A |
| 12I | — | 18.23 | — | — | 1.77 | — | 150 | 0 |
| 12J | — | 13.84 | — | — | 1.79 | 4.36 | 150 | 5 |
| 12K | — | — | 19.8 | — | — | — | 7 | N/A |
| 12L | — | — | 19.8 | 0.2 | — | — | 40 | N/A |
| 12M* | — | — | 19.8 | 0.2 | — | — | 150 | N/A |
| 12N | — | — | 18.23 | — | 1.77 | — | 150 | 0 |
| 12O | — | — | 13.26 | — | 1.96 | 4.78 | 137 | 5 |

*Core-Shell Polymer + formaldehyde heat aged 24 hours at 60° C.
N/A: not available Inclusion of the formaldehyde solution improved solvent resistance. Including formaldehyde and mixing and aging 24 hours at 60° C. prior to application and/or inclusion of a melamine formaldehyde compound that generates formaldehyde further improved solvent resistance.

Inclusion of the polyester polymer of Example 1 in the coating composition improved adhesion after watersoak results while maintaining excellent solvent resistance.

Whereas particular embodiments of this invention have been described above for purposes of illustration, it will be evident to those skilled in the art that numerous variations of the details of the present invention may be made without departing from the invention as defined in the appended claims.

The invention claimed is:

1. A film-forming thermoset coating composition, comprising:
   (a) an aqueous medium; and
   option 1 and/or option 2 as follows:
   option 1:
   (b1) polyurethane-acrylate core-shell particles comprising a polymeric acrylic core at least partially encapsulated by a polymeric shell comprising urethane linkages, wherein the polymeric shell comprises an acid functional group and two or more hydrazide functional groups, wherein the polymeric shell is covalently bonded to at least a portion of the polymeric core;

(c1) (i) formaldehyde; (ii) polyformaldehyde; and/or (iii) a compound that generates formaldehyde, wherein the total amount of formaldehyde present and/or generated in (c1) is in the range of 0.1 to 3 weight %, based on total resin solids of the coating composition; and a crosslinker separate from (b1) and (c1), wherein the crosslinker is reactive with functional groups of (b1), (c1), and/or a reaction product of (b1) and (c1);

option 2:

(b2) polyurethane-acrylate core-shell particles comprising a polymeric acrylic core at least partially encapsulated by a polymeric shell comprising urethane linkages, wherein the polymeric shell comprises an acid functional group and two or more N-methylolated hydrazide functional groups, wherein the polymeric shell is covalently bonded to at least a portion of the polymeric core; and wherein the coating composition includes less than 5 weight percent, based on total resin solids, of polyurethane-acrylate core-shell particles that include keto and/or aldo functional groups.

2. The coating composition of the claim 1, further comprising:

(d) a polyester polymer obtained from components comprising polytetrahydrofuran and a carboxylic acid or anhydride thereof.

3. The coating composition of claim 1, wherein the coating composition comprises option 2.

4. The coating composition of claim 1, further comprising an acid catalyst that is a separate component from the polyurethaneacrylate core-shell particles (b1) and/or (b2) or is covalently bonded to the polyurethane-acrylate core-shell particles (b1) and/or (b2).

5. The coating composition of claim 1, wherein the coating composition comprises option 1, wherein the compound (c1) comprises a melamine-formaldehyde resin.

6. The coating composition of claim 1, wherein the polyurethane- acrylate core-shell particles (b1) and/or (b2) comprise a polyurethane polymer, an acrylic polymer, a polyester polymer, or a combination thereof.

7. The coating composition of claim 1, wherein the polymeric acrylic core comprises an addition polymer formed from (meth) acrylic monomers, vinyl monomers, or a combination thereof.

8. The coating composition of claim 1, wherein the polyurethane- acrylate core-shell particles (b1) and/or (b2) further comprise internal hydrazide functional groups that provide at least 2 secondary amino groups on the polyurethane-acrylate core-shell particles (b1) and/or (b2).

9. The coating composition of claim 4, wherein the acid catalyst comprises carboxylic acid functional groups formed on the polyurethane-acrylate core-shell particles (b1) and/or (b2) and which are obtained from a carboxylic acid or anhydride thereof having a pKa of less than 5.5.

10. The coating composition of claim 9, wherein the carboxylic acid or anhydride thereof comprises trimellitic anhydride.

11. The coating composition of claim 1, wherein the polyurethane-acrylate core-shell particles (b1) and/or (b2) further comprise internal maleate functional groups.

12. The coating composition of claim 1, wherein the polyurethane-acrylate core-shell particles (b1) and/or (b2) comprise aliphatic and/or aromatic rings.

13. The coating composition of claim 1, further comprising (e) a polymer reactive with (b1), (b2), and/or (c1), wherein the polymer (e) is obtained from components comprising N-(hydroxymethyl) acrylamide, N (isobutoxymethyl) acrylamide, or a combination thereof.

14. The coating composition of claim 2, wherein the polyester polymer (d) comprises a hydroxyl functional group.

15. The coating composition of claim 2, wherein the polyester polymer (d) is obtained from components comprising polytetrahydrofuran and a carboxylic acid or anhydride thereof, wherein the polytetrahydrofuran comprises at least 20 weight % of the components that form the polyester polymer (d) and the carboxylic acid or anhydride thereof comprises at least 5 weight % of the components that form the polyester polymer (d).

16. The coating composition of claim 1, further comprising (f) an adhesion promoter comprising a silane compound.

17. The coating composition of claim 1, wherein the crosslinker (g) comprises a blocked isocyanate, a carbodiimide, an aminoplast, or a combination thereof.

18. A substrate at least partially coated with a coating formed from the coating composition of claim 1.

19. The coating composition of claim 1, wherein the coating composition includes less than 1 weight percent, based on total resin solids, of polyurethane-acrylate core-shell particles that include keto and/or aldo functional groups.

20. The coating composition of claim 1, wherein the coating composition is free of polyurethane-acrylate core-shell particles that include keto and/or aldo functional groups.

* * * * *